(12) United States Patent  (10) Patent No.: US 8,266,010 B2
Raghavan  (45) Date of Patent: Sep. 11, 2012

(54) METHODS AND SYSTEMS FOR SUPPORTING ASSET EXCHANGE

(76) Inventor: Sri Raghavan, Jersey City, NJ (US)

( * ) Notice: Subject to any disclaimer, the term of this patent is extended or adjusted under 35 U.S.C. 154(b) by 337 days.

(21) Appl. No.: 12/609,416

(22) Filed: Oct. 30, 2009

(65) Prior Publication Data

US 2010/0131383 A1  May 27, 2010

Related U.S. Application Data

(60) Provisional application No. 61/197,818, filed on Oct. 30, 2008.

(51) Int. Cl.
*G06Q 30/00* (2012.01)
(52) U.S. Cl. ................................................ 705/26.3
(58) Field of Classification Search .............. 705/26.1, 705/26.3
See application file for complete search history.

(56) References Cited

U.S. PATENT DOCUMENTS

| | | | |
|---|---|---|---|
| 6,119,229 | A | 9/2000 | Martinez et al. |
| 6,415,270 | B1 | 7/2002 | Rackson et al. |
| 6,847,938 | B1 | 1/2005 | Moore |
| 6,947,898 | B2 | 9/2005 | Postrel |
| 7,096,190 | B2 | 8/2006 | Postrel |
| 7,158,956 | B1 | 1/2007 | Himmelstein |
| 7,647,269 | B2 * | 1/2010 | Brett ............................ 705/37 |
| 2002/0165817 | A1 | 11/2002 | Rackson et al. |
| 2004/0039682 | A1 | 2/2004 | Sandholm et al. |
| 2005/0144115 | A1 * | 6/2005 | Brett ............................ 705/37 |
| 2005/0203827 | A1 * | 9/2005 | Gamble ...................... 705/37 |
| 2005/0283417 | A1 | 12/2005 | Miles et al. |
| 2006/0265317 | A1 | 11/2006 | Duquette |
| 2007/0022042 | A1 | 1/2007 | Nishi |
| 2008/0103852 | A1 | 5/2008 | Byde |
| 2009/0091572 | A1 * | 4/2009 | Stephens et al. ............. 345/440 |

OTHER PUBLICATIONS

Loker, David Ryan, "Representations and Parameterizations of Combinatorial Auctions," University of Waterloo (Canada), 2008, 135 pages.*

Notification of Transmittal of the International Search Report and the Written Opinion of the International Searching Authority, or the Declaration, International Search Report and Written Opinion in International Application No. PCT/US2009/062751, 8 pages, mailed Sep. 30, 2010.

Notification Concerning Transmittal of International Preliminary Report on Patentability and International Preliminary Report on Patentability, for International Application No. PCT/US2009/062751, 7 pages, mailed May 12, 2011.

* cited by examiner

*Primary Examiner* — Amee A Shah
(74) *Attorney, Agent, or Firm* — Hamilton, Brook, Smith & Reynolds, P.C.

(57) ABSTRACT

In typical two-way trading systems, bidders cannot trade directly with other bidders, and sellers cannot trade directly with other sellers, resulting in possible missed trading opportunities. Methods, systems, devices, and networks for enabling two-way trading systems to perform multi-party exchanges are disclosed. Example embodiments allow multiple bidders (buyers), multiple sellers, or a seller and bidder of separate marketplaces to trade among themselves. Embodiments may discover, for bidders and sellers, opportunities to trade with other sellers or bidders, or both, without a time-consuming and limited process of searching and discovering relevant opportunities. Bidders and sellers may not find such opportunities on their own in typical two-way trading systems. The embodiments may be implemented as stand-alone systems or as add-ons that may be used to augment or enhance existing two-way trading systems.

34 Claims, 17 Drawing Sheets

METHODS AND SYSTEMS FOR SUPPORTING ASSET EXCHANGE

RELATED APPLICATION

This application claims the benefit of U.S. Provisional Application No. 61/197,818, filed on Oct. 30, 2008. The entire teachings of the above application are incorporated herein by reference.

BACKGROUND OF THE INVENTION

Many methods for asset exchange are prevalent, from public marketplaces to private marketplaces and online computer-enabled mechanisms to offline human-managed environments. The Internet is commonly used for the exchange of assets using multiple popular methods ranging from mirroring the simple classifieds section of a newspaper to more direct search and trade or auction-based systems.

SUMMARY OF THE INVENTION

One embodiment for supporting asset exchanges between parties of an auction is a system that includes a transformation module that transforms representations of bidders' auction bids into representations of bidders' bidding assets and representations of bidders' bid-on auction assets. A bidder's "bidding asset" is defined as an asset that the bidder uses to place a bid (e.g., cash or other assets that have value). A bidder's "bid-on auction asset" is defined as an asset for which the bidder places a bid (i.e., an asset that the bidder seeks to acquire). A "representation" is any construct able to be operated on by, for example, a computer processor, or presented in its own form or other form to, for example, a person or computer processor in a network node or server. The system also includes a translation module that translates representations of sellers' auction assets into vertices of a directed graph and representations of sellers' auction desires into edges of the directed graph, and that translates the representations of bidders' bidding assets into vertices of the directed graph and the representations of bidders' bid-on auction assets into edges of the directed graph. The system further includes a cycle determination module that determines cycles in the directed graph. A cycle is defined as a path that starts and ends at the same vertex and that includes multiple edges and at least one intermediate vertex. Also included in the system is an offer module that transforms the cycles into offers among the parties and that performs an action based on the offers.

The representations of sellers' auction desires may include representations of desired assets with precise values, which may include cash, loyalty points, or an asset having a market value that is guaranteed, appraised, or certified for a specific value or value range in cash or points.

The cycle determination module may determine whether a first cycle shares a vertex or edge with a second cycle, and the offer module may then transform either the first cycle or the second cycle into an offer in an event the first cycle shares a vertex or edge with the second cycle. The cycle determination module may prioritize the cycles based on representations of preferences associated with the sellers' auction desires, or may sequence and prioritize the cycles according to preset parameters. Preset parameters may include parameters of exact matches and inexact matches or parameters representing committed desires and uncommitted desires, and the cycle determination module may order the cycles from exact matches to inexact matches or from committed desires to uncommitted desires according to the parameters.

A cycle may have a positive value if a total value offered in the cycle exceeds a total value demanded in the cycle, and the offer module may transform cycles having positive values into offers and present representations of the offers to respective sellers. The offer module may further determine whether excess positive value exists in a cycle and may direct the excess positive value to a seller, bidder, or asset exchange intermediary. In an event a cycle has a negative value, the offer module may make a determination whether one or more parties involved in the cycle is or are willing to (i) accept an offer that is of lesser value than their respective desired asset or (ii) offer more value than their respective desired offer, and may adjust the representations of the parties' auction desires based on the determination.

The offer module may present representations of the offers to the sellers if the sellers' auction desires are not met or may execute asset exchanges between the sellers and bidders if the sellers' auction desires are met. Alternatively, the offer module may present representations of the offers to the sellers or execute an asset exchange based on asset exchange parameters set by the sellers and bidders. The offer module may close an offer upon acceptance of the offer by the corresponding sellers, decline of the offer by one of the corresponding sellers, or reaching a timeout associated with the offer. The offer module may also transform a cycle into a contingent offer if the cycle includes representations of three or more parties, the sellers' auction desires are not exactly matched, or the cycle has an associated timeout that is set to be reached at a given time in the future.

The system may also include an interface to multiple auctions or trading forums occurring at the same time, where the interface enables a party of the auction to list an auction asset in at least one of the multiple auctions or trading forums, and may further include a monitor module that monitors the multiple auctions or trading forums and, in an event the party's auction asset is exchanged or sold in one of the auctions or trading forums, withdraws the party's auction asset from the remaining auctions or trading forums.

Another embodiment for supporting asset exchanges between parties of an auction is a method that includes transforming representations of bidders' auction bids into representations of bidders' bidding assets and representations of bidders' bid-on auction assets, translating representations of sellers' auction assets into vertices of a directed graph and representations of sellers' auction desires into edges of the directed graph, and translating the representations of bidders' bidding assets into vertices of the directed graph and the representations of bidders' bid-on auction assets into edges of the directed graph. The method also includes determining cycles in the directed graph, transforming the cycles into offers between the parties, and performing an action based on the offers.

An embodiment for operating an auction includes a method that includes transforming a representation of a first party's role in the auction by offering an asset, in the form of a representation of the asset, of the first party to a second party in exchange for an asset of the second party.

Transforming the representation of a first party's role may include (i) transforming a representation of a first seller of a first auction asset into a representation of a bidder of a second auction asset of a second seller by offering the first auction asset, in the form of a representation of the first auction asset, to the second seller in exchange for the second auction asset, (ii) transforming a representation of a first bidder, bidding for a bid-on asset and having a first bidding asset, into a representation of a seller by offering the first bidding asset, in the form of a representation of the first bidding asset, to a second bidder, who is also bidding for the bid-on asset and who has a second bidding asset, in exchange for the second bidding asset, or (iii) transforming a representation of a first bidder, bidding for a first bid-on asset and having a first bidding asset, into a representation of a seller by offering the first bidding asset, in the form of a representation of the first bidding asset, to a second bidder, who is bidding for a second bid-on asset different from the first bid-on asset and who has a second bidding asset, in exchange for the second bidding asset.

The method may also include obtaining relevant information about one or more wide area network marketplaces, detecting multi-party trading opportunities based on the relevant information, transforming representations of the opportunities into initial or revised offers for parties relevant to the trading opportunities, and communicating representations of the offers to the parties. In some embodiments, the relevant information may be obtained using a network crawler designed to work with one or more of the wide area network marketplaces or through a direct interface or connection between a trading server and one or more of the wide area network marketplaces.

Another embodiment for operating an auction is a method that includes offering a bidder's bidding asset, in the form of a representation of the bidding asset, to a seller of an auction asset in exchange for the seller's auction asset, the bidder already bidding on a bid-on auction asset that is different from the seller's auction asset.

Another embodiment is an asset exchange server that includes an activation module that activates seller nodes to enable participation of sellers in the asset exchange marketplace and that activates bidder nodes to enable participation of bidders in the asset exchange marketplace. The asset exchange server also includes a transformation module that facilitates offering and bidding exchanges among the seller and bidder nodes as a function of representations of the sellers' auction assets and auction desires and the bidders' bidding assets and bid-on auction assets, and that transmits messages to the seller and bidder nodes to cause the nodes to recognize a state of an exchange of the sellers' and bidders' assets.

The seller nodes may include a first seller node and a second seller node, where a first auction asset is associated with the first seller node, and where a second auction asset is associated with the second seller node. In such a configuration, the transformation module may transform a state of the first seller node into a bidder node by transmitting a message to the second seller node, where the message includes a representation of an offer to exchange the first auction asset for the second auction asset.

The bidder nodes may include a first bidder node and a second bidder node, where a first bidding asset is associated with the first bidder node, and where a second bidding asset is associated with the second bidder node. In such a configuration, the transformation module may transform a state of the first bidder node into a seller node by transmitting a message to the second bidder node, where the message includes a representation of an offer to exchange the first bidding asset for the second bidding asset.

An embodiment for operating an asset exchange marketplace is a method that includes activating seller and bidder nodes to enable participation of sellers and bidders in the asset exchange marketplace, facilitating offering and bidding exchanges among the seller and bidder nodes as a function of representations of the sellers' auction assets and auction desires and the bidders' bidding assets and bid-on auction assets, and transmitting messages to the seller and bidder nodes to cause the nodes to recognize a state of an exchange of the sellers' and bidders' assets.

An embodiment for supporting asset exchanges in a network is a device that includes communication ports associated with respective entity interface devices, where communication ports associated with selling entity interface devices are in a selling state, and where communication ports associated with bidding entity interface devices are in a bidding state. The device also includes a processor that changes the state of a communication port from a selling state to a bidding state, or a bidding state to a selling state, by transmitting over a given communication port a message including a representation of an offer for an asset associated with another communication port.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 14 illustrates an example interface to a hybrid barter auction.

FIG. 15 illustrates an example interface to a hybrid barter auction where an offer to a party is presented after the party's auction information has been processed by the system.

DETAILED DESCRIPTION OF THE INVENTION

A description of example embodiments of the invention follows.

A two-way trade is defined as one where the resulting trade is between two parties, namely, a buyer and a seller. An auction is a two-way trade in which the final transaction is between two parties (i.e., a seller and a buyer). An embodiment of the present invention can be applied to the exchange of assets in auction systems that may be deployed online or offline and optionally using third-party proprietary software platforms. Specifically, one example embodiment enables the transformation of a two-party auction trading system to a multi-party asset exchange or trading system. A multi-party asset exchange or trading system allows two or more parties to participate in trading opportunities in a manner in which the sellers and buyers find opportunities to trade among themselves. In this type of system, sellers may find ways to trade with other sellers and bidders may find ways to trade with other bidders.

One embodiment of the present invention is a system that transforms auctions that are 'two-way transaction' marketplaces into interconnected networks of multi-party auction transactions. The embodiment also allows the exchange of assets between and among sellers, buyers, and asset exchange intermediaries that are otherwise not possible in a two-way trading system.

Embodiments of the present invention may be implemented using a computerized system designed to transform and enable two-way auction platforms to perform multi-party exchanges. The system may be designed to work with any user interface, such as, for example, an Internet auction site or private auction trading system. The computerized system may be used as a stand-alone system or as an add-on system that can be used to augment or enhance an existing two-way auction-based trading system, either online or offline, to enable multi-party exchange capabilities. The system can either extract or receive information about parties that interact through the user interface, and such information can be extracted or received in an automated manner.

Figure 1:
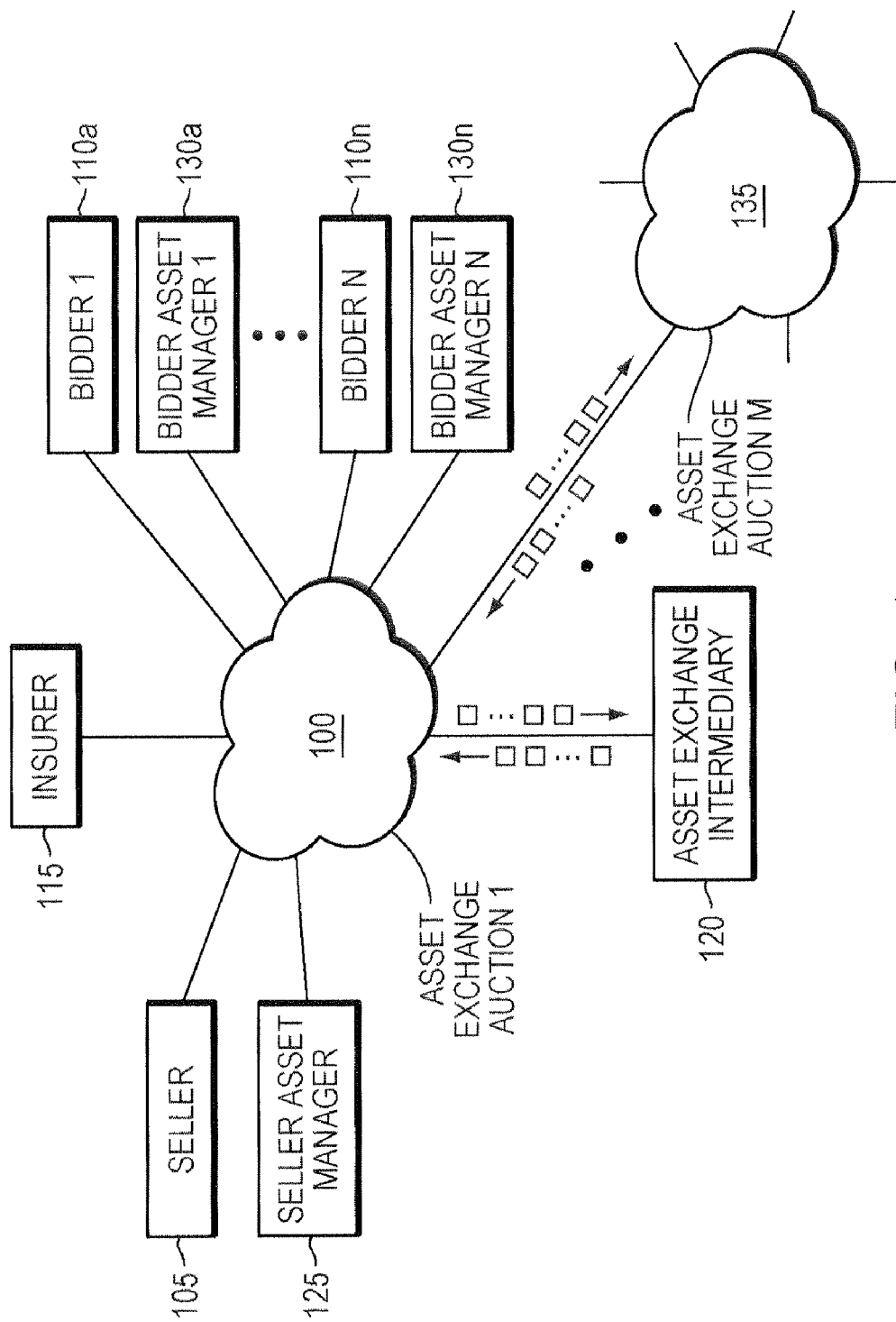
FIG. 1 is a depiction of inter-connected marketplaces for auctions, using computer networks including, for example, the Internet. The figure depicts the presence of various parties that facilitate or participate in the auction process. The parties include sellers, bidders, asset exchange intermediary, and insurer that are involved with the auction or trading platform. The figure further depicts a seller's asset manager, which may be a computer system, and, similarly, a bidder's asset manager, which may also be a computer system.

FIG. 1 is a depiction of inter-connected marketplaces for a auction 100. The parties of the example marketplace include a seller 105, bidders 110a-n, an insurer 115, and other third-party facilitators, such as an exchange intermediary 120. The system of FIG. 1 provides for an asset managers 125 and 130a-n, which are facilitating tools that are used to store sellers' and bidders' asset information, respectfully, and other auction and bid details. An asset manager allows the configuration of various parameters pertaining to an auction or a bid.

FIG. 1 further represents a marketplace 100 in the form of a network cloud. Every auction marketplace has its own cast of players that can participate in the marketplace, including bidders 110a-n, sellers 105, exchange intermediaries 120, and insurers 115. All of these roles are illustrated in the figure.

FIG. 1 also shows that one marketplace 100 can be connected to another marketplace 135 through a method of networking or communication, such as, for example, the Internet or other wide area network. The mixing of bidders and sellers along with their assets across auction marketplaces 100, 135 is represented in the dots and boxes drawn above the connecting line between the two marketplaces 100, 135.

Figure 2:
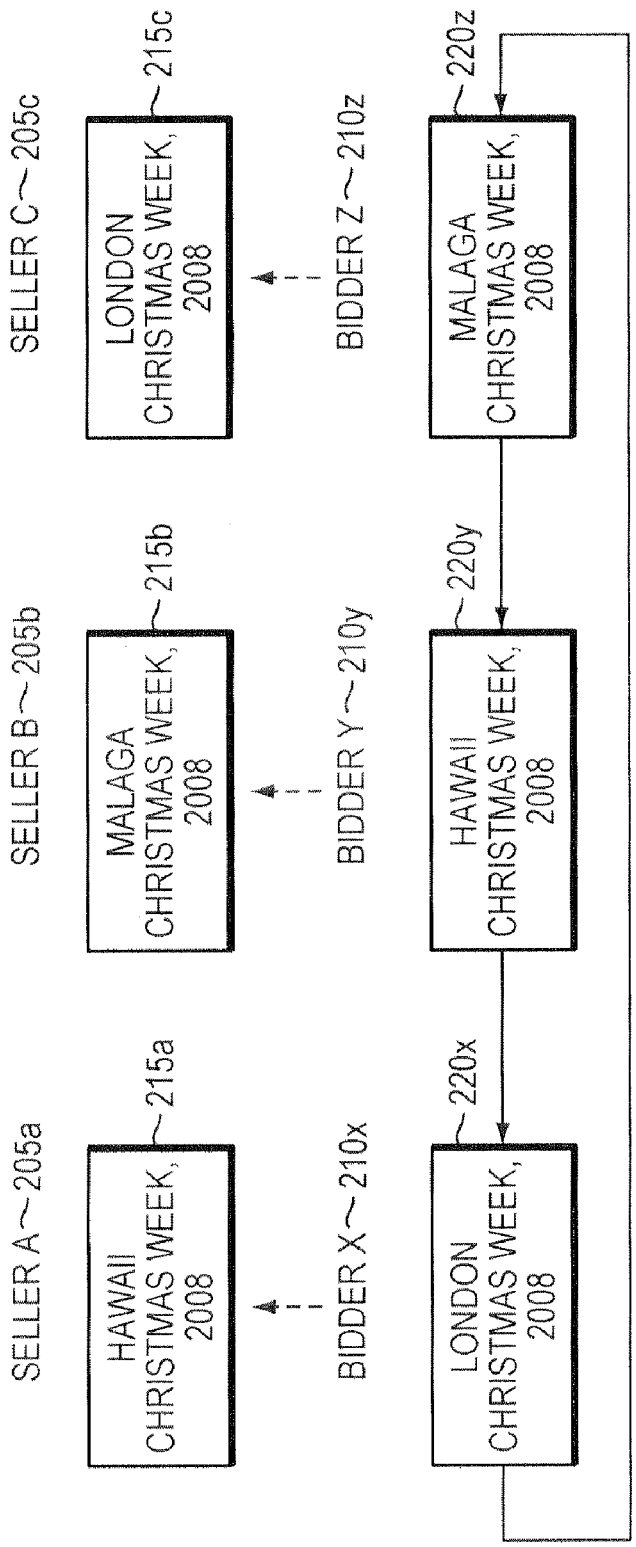
FIG. 2 illustrates a barter auction where a system has detected an opportunity for bidders to trade among themselves in a multi-party trade.
Figure 10:
FIG. 10 illustrates an English auction where a system has detected a barter trade opportunity.
Figure 10:
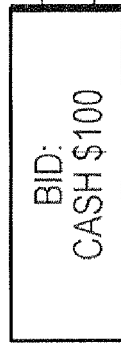
Figure 10:
Figure 11:
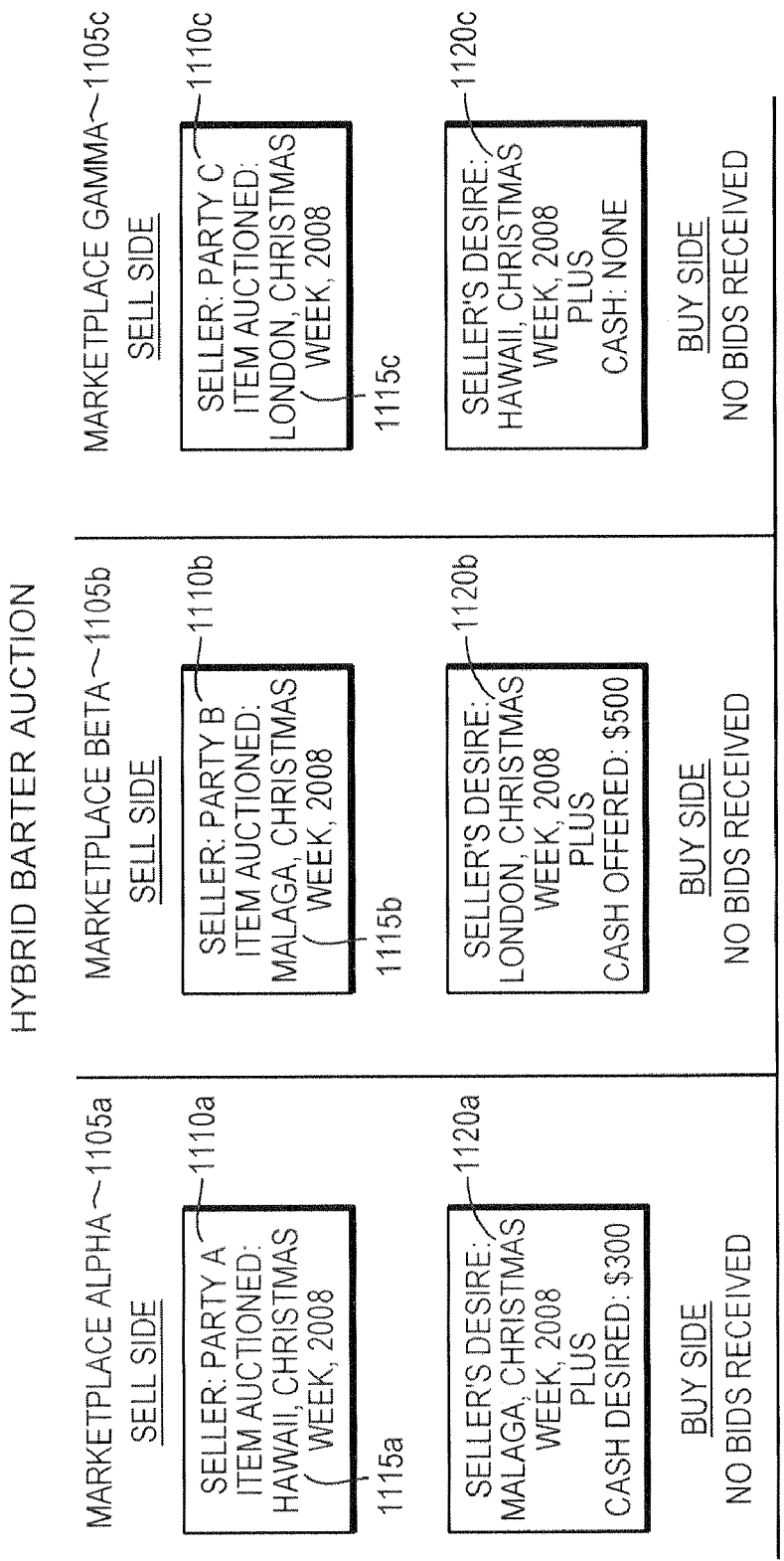
FIG. 11 illustrates a hybrid barter auction with a possible multi-party trade across marketplaces, as well as an opportunity for an arbitrage.
Figure 16:
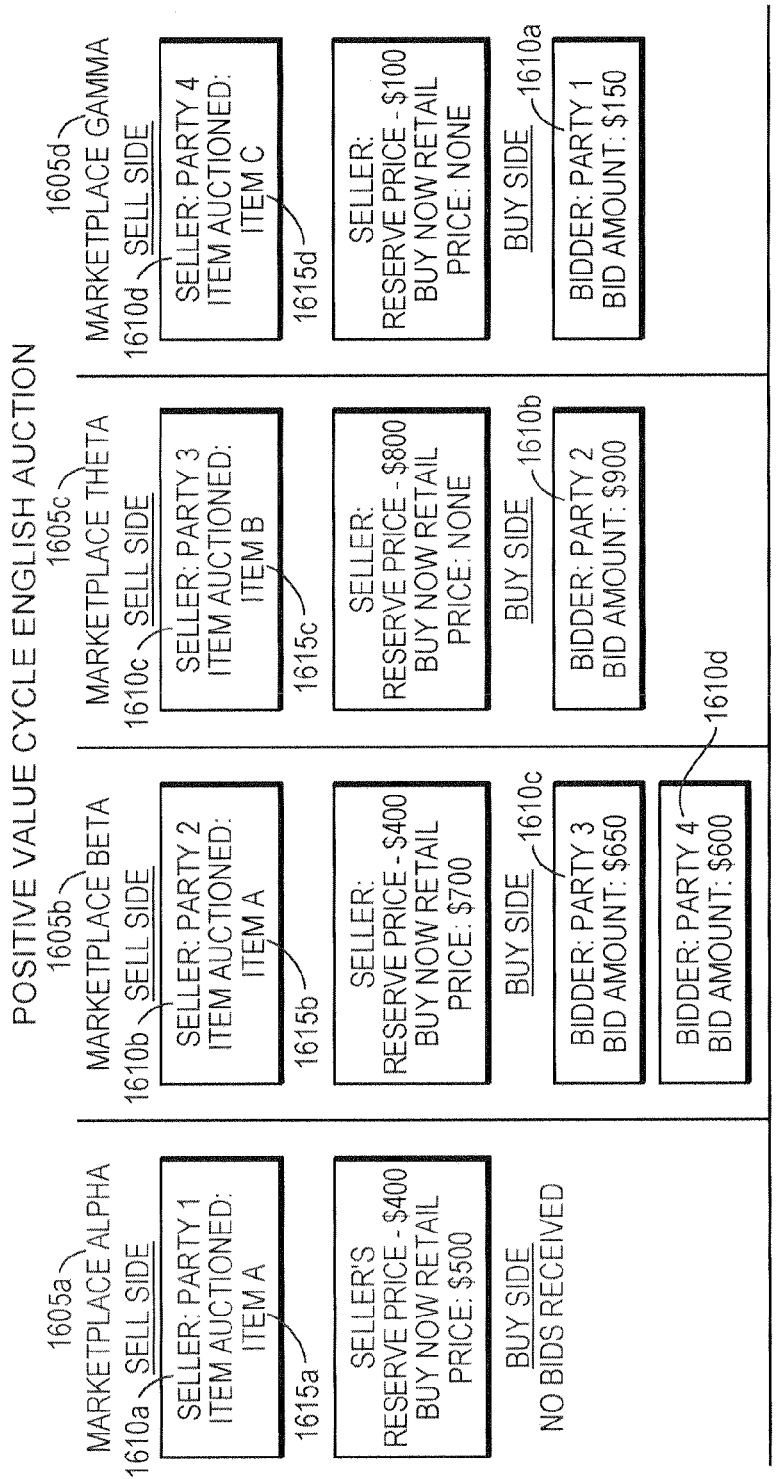
FIG. 16 illustrates an English auction where a system has detected multi-party opportunities across auctions and marketplaces that result in a part-barter, part-auction, and part-retail purchase.

Several example embodiments are described below. For example, FIG. 2 illustrates an embodiment in a barter auction marketplace. FIG. 10 illustrates an embodiment in a currency-based English auction marketplace, FIG. 11 illustrates an embodiment in a hybrid "barter-plus-cash" auction marketplace, FIG. 16 illustrates an embodiment in a hybrid "barter-plus-cash" auction marketplace in the context of an English auction. A barter auction is an auction in which currency need not be used as a facilitator. In this type of auction, the seller puts up his asset for auction, and bidders bid on the asset, not necessarily with cash, but with any other asset. The seller then chooses the bidder whose bid he wants to accept. In all of these auction systems, however, the end result is always a two-way trade between one bidder and one seller.

FIG. 2 illustrates a barter auction where a system has detected an opportunity for bidders to trade among themselves in a multi-party trade. The auction is in the context of auctions of holidays at vacation homes. This barter auction marketplace has three sellers, A 205a, B 205b, and C 205c, who have their own barter auctions. Seller A 205a has an auction for a holiday at his vacation home in Hawaii for the week of Christmas 2008, starting the Friday before Christmas 2008 (215a). Seller B 205b has an auction for a holiday at his vacation home in Malaga, Spain for the week of Christmas 2008, starting the Friday before Christmas 2008 (215b). Seller C 205c has an auction for a holiday at his vacation home in London, England for the week of Christmas 2008, starting the Friday before Christmas 2008 (215c).

The barter auction also has three bidders, X 210x, Y 210y, and Z 210z, one bidder for each of the auctions of sellers A 205a, B 205b, and C 205c. Bidder X 210x places a bid in seller A's 205a auction using his asset 220x, which is a holiday for the week of Christmas 2008, starting the Friday before Christmas 2008 at his vacation home in London. Bidder Y 210y places a bid in seller B's 205b auction using his asset 220y, which is a holiday for the week of Christmas 2008, starting the Friday before Christmas 2008 at his vacation home in Hawaii. Bidder Z 210z places a bid in seller C's 205c auction using his asset 220z, which is a holiday for the week of Christmas 2008, starting the Friday before Christmas 2008 at his vacation home in Malaga, Spain. In the above auctions, while it is not clear whether each seller 205a-c will accept the bids made by the bidders 210x-z in the separate auctions that could take place across multiple marketplaces, it is clear that there is a trading opportunity among the three bidders 210x-z. This is possible because Bidder X 210x has revealed a desire to go to Hawaii by bidding on Seller A's 205a auction. Likewise, Bidders Y 210y and Z 210z have revealed desires to go to Hawaii and London, respectively. Thus, a multi-party trade can take place among the bidders 210x-z across the multiple auctions such that (i) bidder X 210*x* takes bidder Y's 210*y* Hawaii asset 220*y*, (ii) bidder Y 210*y* takes bidder Z's 210*z* asset in Malaga 220*z*, and (iii) bidder Z 210*z* takes bidder X's 210*x* asset in London 220*x*.

Figure 3:
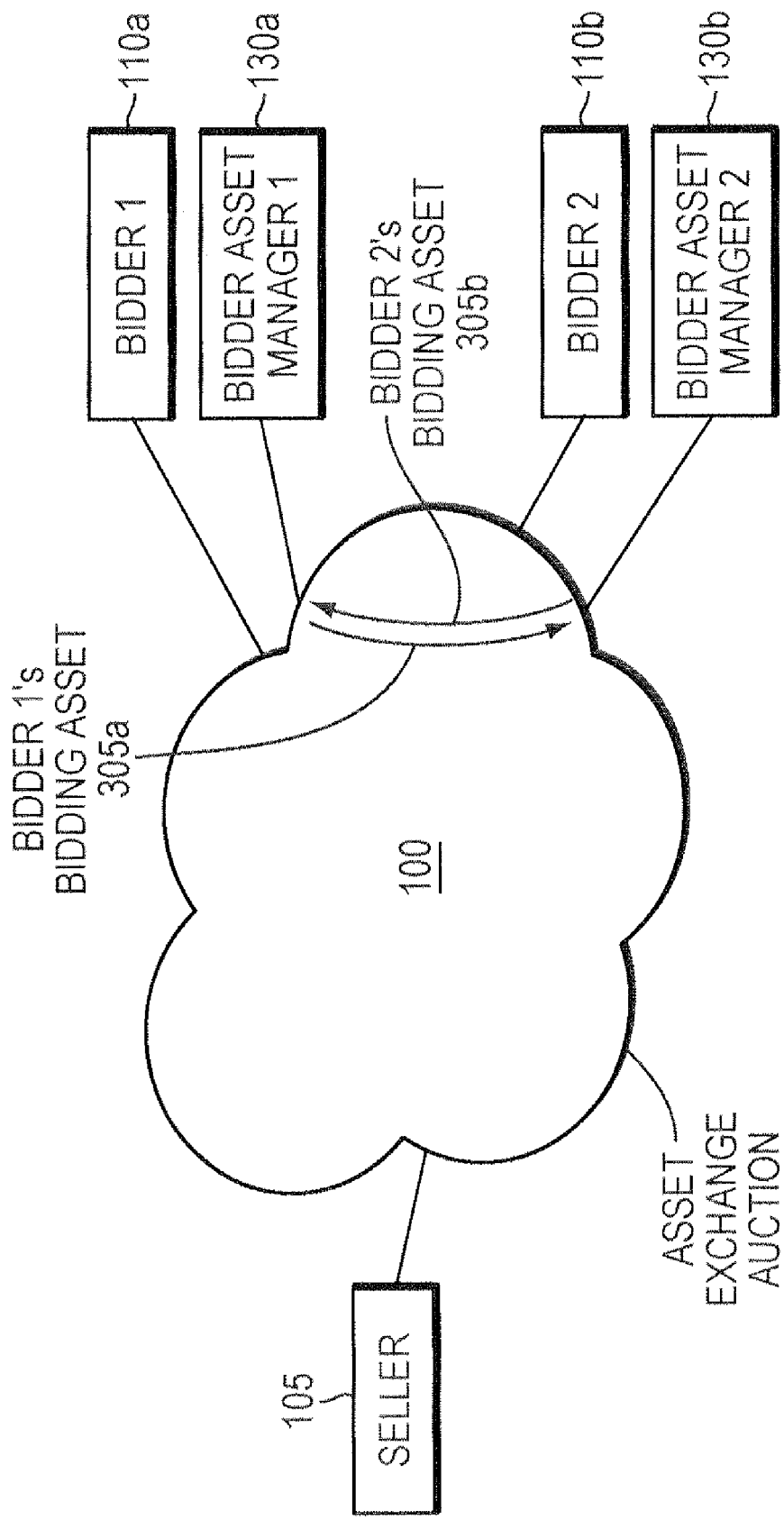
FIG. 3 illustrates an auction marketplace where a system has detected an opportunity for two bidders in a specific auction to trade among themselves without engaging with a seller of the auction.

FIG. 3 illustrates a variation of the above example. According to the example embodiment of FIG. 3, there are two bidders 1 110*a* and 2 110*b* that exchange their assets 305*a*, 305*b* among themselves within the same auction 100. The exchanges are depicted by a curved line from bidder 1 110*a* to bidder 2 110*b* with an arrow directed at bidder 2 110*b* showing that bidder 1 110*a* is offering his asset to bidder 2 110*b* and another curved line from bidder 2 110*b* to bidder 1 110*a* with an arrow pointing at bidder 1 110*a* showing that bidder 2 110*b* is offering his asset to bidder 1 110*a*.

Such an exchange is enabled by allowing the system to infer the bidders' 110*a*, 110*b* alternate desires through multiple methods, including an explicit representation of those desires by the bidders 110*a*, 110*b*. The explicit representations, for example, can be registered through asset managers 130*a*, 130*b*, or can be inferred from past transaction histories within the same or other marketplaces, past or present bids, and/or auctions within the same marketplace or other marketplaces. Such a system of trades among the bidders of multiple auctions is also possible across multiple auctions in multiple marketplaces.

Figure 4:
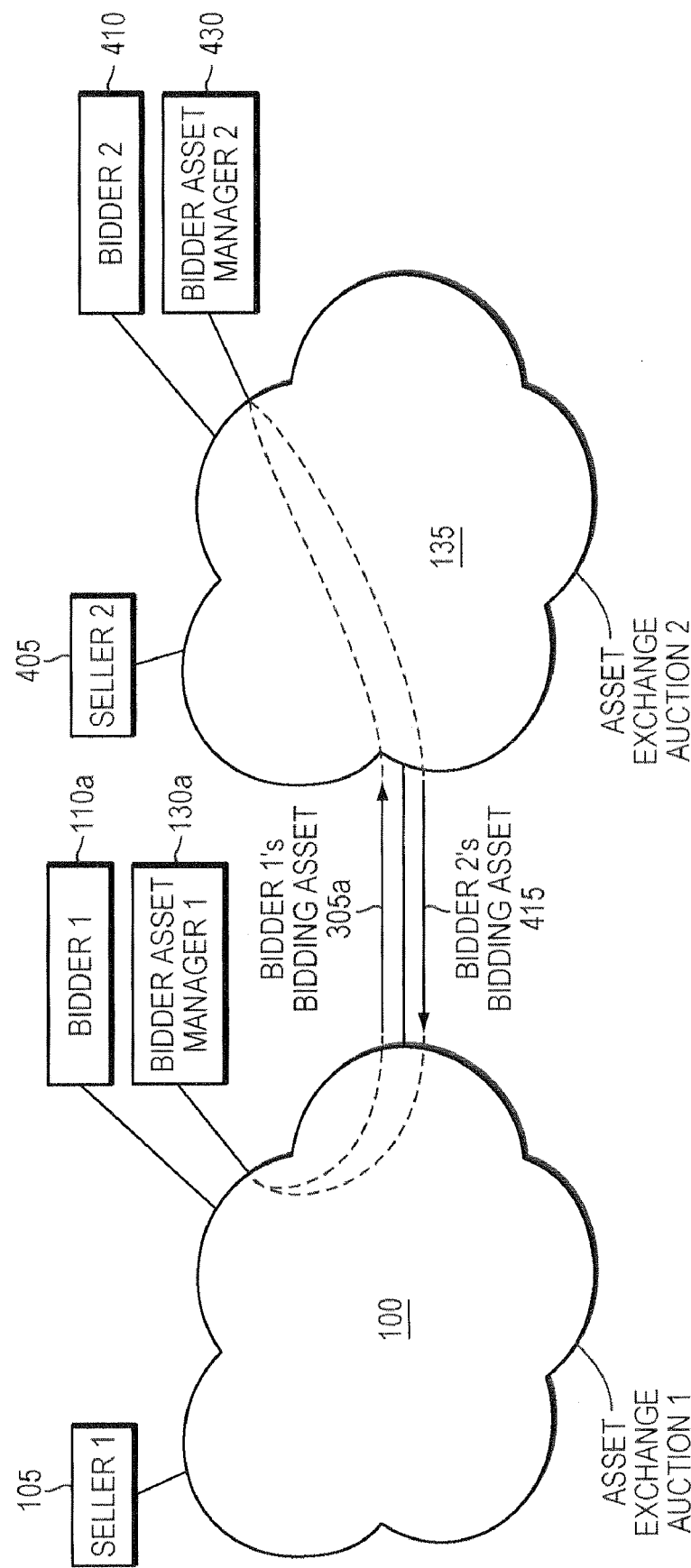
FIG. 4 illustrates inter-connected marketplaces for auctions, using computer networks including, for example, the Internet, where a system has detected an opportunity for bidders' bidding in two different auctions across two different marketplaces to trade among themselves.

FIG. 4 illustrates inter-connected marketplaces where a system has detected an opportunity for bidders' bidding in two different auctions across two different marketplaces to trade among themselves. Information from two different marketplaces 100, 135 as depicted by the two clouds can be retrieved using a device, such as, for example, a "crawler" (i.e., a system which automatically searches and discovers information on a network). The system identifies an opportunity between bidder 1 110*a*, in asset exchange auction 1 100 from one marketplace, and bidder 2 410, in asset exchange auction 2 135 from another marketplace, to exchange their assets 305*a*, 415. The opportunity for exchange among bidder 1 110*a* and bidder 2 410 is shown via arrows crossing the two clouds. The lines are denoted as dotted lines as they traverse their own marketplace and as solid lines as they cross marketplaces. The direction of the arrows shows the exchange from bidder 1 110*a* to bidder 2 410. Additionally, a third straight line connecting the two clouds depicts that the two marketplaces 100, 135 are interconnected.

Multiple methods may be used to enable two-way auction platforms to perform multi-party exchanges. In one embodiment, a system translates information pertaining to a seller's asset and desires in an auction into a directed graph, representing the information as edges and vertices of the graph. Similarly, the embodiment translates bidders' bidding assets and bid-on assets into edges and vertices of the graph. A "graph" in this context refers to a collection of vertices and edges that connect pairs of vertices. Typically, a graph may be undirected, meaning that there is no distinction between the two vertices associated with each edge, or a graph may be directed, meaning that its edges are be directed from one vertex to another.

A bidder's "bidding asset" is defined as an asset that the bidder uses to place a bid. This is often cash, but it could also be other assets that have value. A bidder's "bid-on asset" is defined as an asset for which the bidder is bidding (i.e., the asset that the bidder seeks to acquire). The system uses this information from the two-way trading systems, along with the sellers' and bidders' information, to detect multi-party trading opportunities that do not restrict the parties to their specific auctions or two-way trades. In addition, the system represents the multi-party opportunities as offers to sellers and bidders who can, in this way, trade among each other and across multiple auctions that are part of different marketplaces.

The system may, thus, allow multiple bidders (buyers) to trade among themselves as described above in FIGS. 2-4, trade with other sellers, or both. The system may discover in an automated manner, for bidders and sellers, opportunities to trade with other sellers or bidders, or both, without the time-consuming and/or naturally limited process of searching and discovering relevant opportunities. Bidders and sellers may not find such opportunities on their own in typical two-way auction trading platforms. In the known art, bidders cannot trade directly with other bidders, and sellers cannot directly trade with other sellers in an auction or two-way trading environment.

Figure 5:
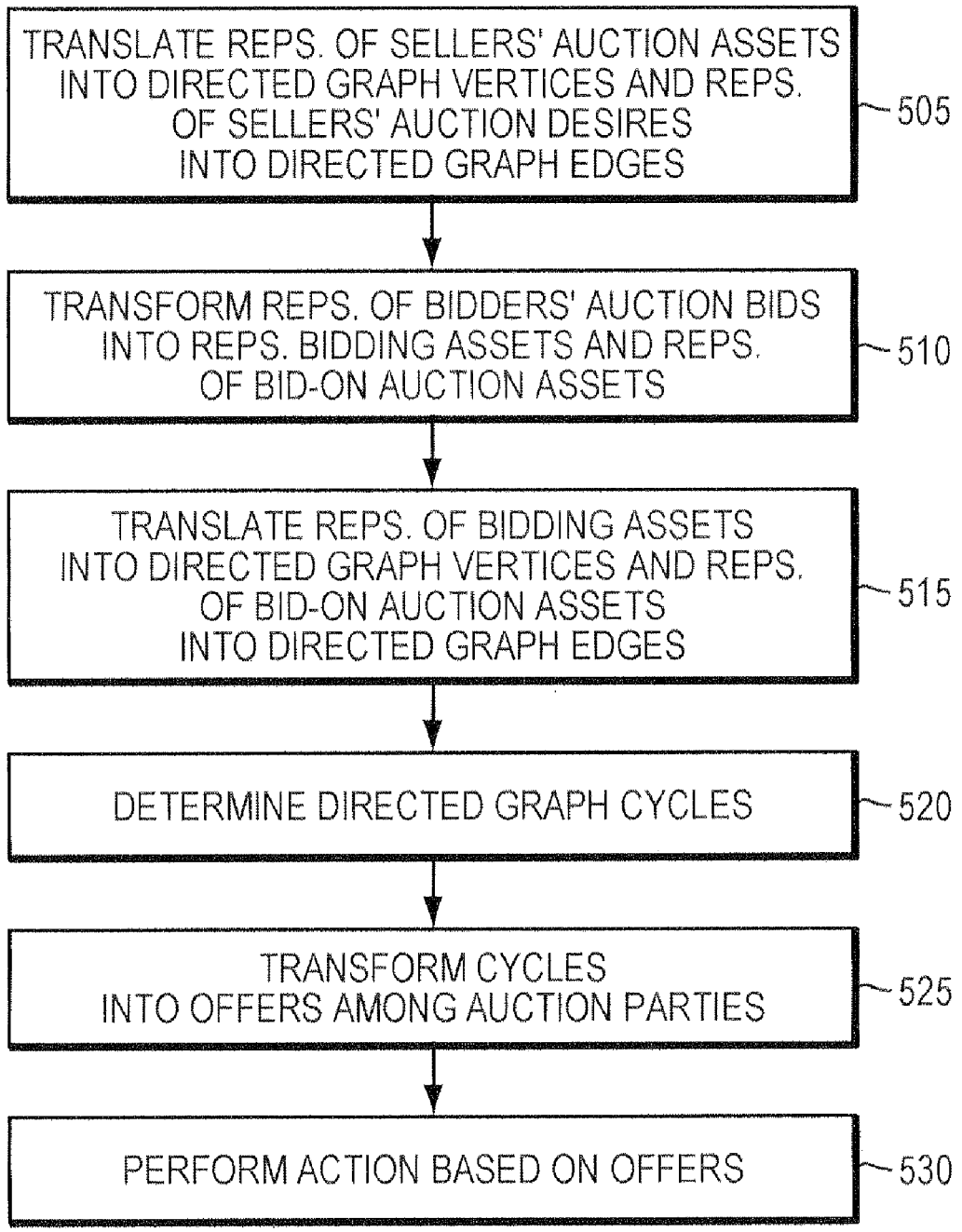
FIG. 5 is a flow chart illustrating a method of supporting asset exchanges between parties in a marketplace. The figure illustrates that information is translated into edges and vertices of a directed graph by, for example, a computer program. The actions further illustrates that multi-party trading opportunities are detected in the form of cycles in the graph, which are transformed into offers for the parties of the marketplace.

FIG. 5 is a flow chart illustrating a method of supporting asset exchanges between parties in a marketplace, according to one example embodiment. According to the example embodiment, sellers' auction assets are translated the into vertices of a directed graph, and the sellers' desires are translated into edges of the graph (505). In the example described above with reference to FIG. 2, the sellers' auction assets are translated into a vertices, but because the sellers did not reveal desires, no edges are observed from the data.

Bidders' auction bids are transformed into representations of bidding assets and bid-on auction assets (510). The bidders' revealed desires, indicated by the assets they bid for, are the bidders' bid-on assets, while the bidders' own property, with which they bid, are the bidders' bidding assets. Bidders' bid-on assets are translated into edges of the graph. For example, with reference to FIG. 2, bidder X 210*x* has revealed a desire to go to Hawaii by bidding on seller A's 205*a* auction. This desire is transformed into the bidder's bid-on asset and is translated into an edge of the graph. Bidders' bidding assets are translated into vertices of the graph. For example, bidder X's 210*x* own asset 220*x*, which he used to place a bid (i.e., his asset in London), is translated into a vertex of the graph. Similarly, other bidders' bidding and bid-on assets are also translated into directed graph components (515).

Cycles in the graph are then determined (520). A cycle is defined as a path that starts and ends at the same vertex and that includes multiple edges and at least one intermediate vertex. Cycles are also known as "closed paths" meaning that the path has no repeated vertices or edges other than the starting and ending vertex. A closed path in a directed graph may be referred to as a "closed directed path." Cycles may be determined in a variety of ways. One example way to determine cycles in a graph is to perform a depth-first traversal of the graph, maintaining a stack that contain all vertices in a current depth-first traversal of the graph. During the traversal, if an element is encountered that is already in the stack, such an encounter indicates a cycle. In the example of FIG. 2, one such cycle exists among bidders X 210*x*, Y 210*y*, and Z 210*z*. While FIG. 2 illustrates a multi-party trade discovered among the bidders, cycles may also exist among sellers or among both sellers and bidders.

In determining the cycles of the graph, the example embodiment may ensure that when multiple cycles are determined, no vertex is shared across multiple cycles. In other words, disjoint cycles are determined. In terms of the embodiment in FIG. 4, the example embodiment may ensure that a bidder's bidding asset, such as bidder X's asset of a holiday week in London, is only used in satisfying the needs of one other party, namely bidder Z, and is not simultaneously used to satisfy multiple parties, which would result in a conflict.

The cycles are then transformed into offers among the parties of the marketplace (525), and an action is performed based on the offers (530), e.g., presenting, accepting, rejecting or modifying the offers.

Figure 6:
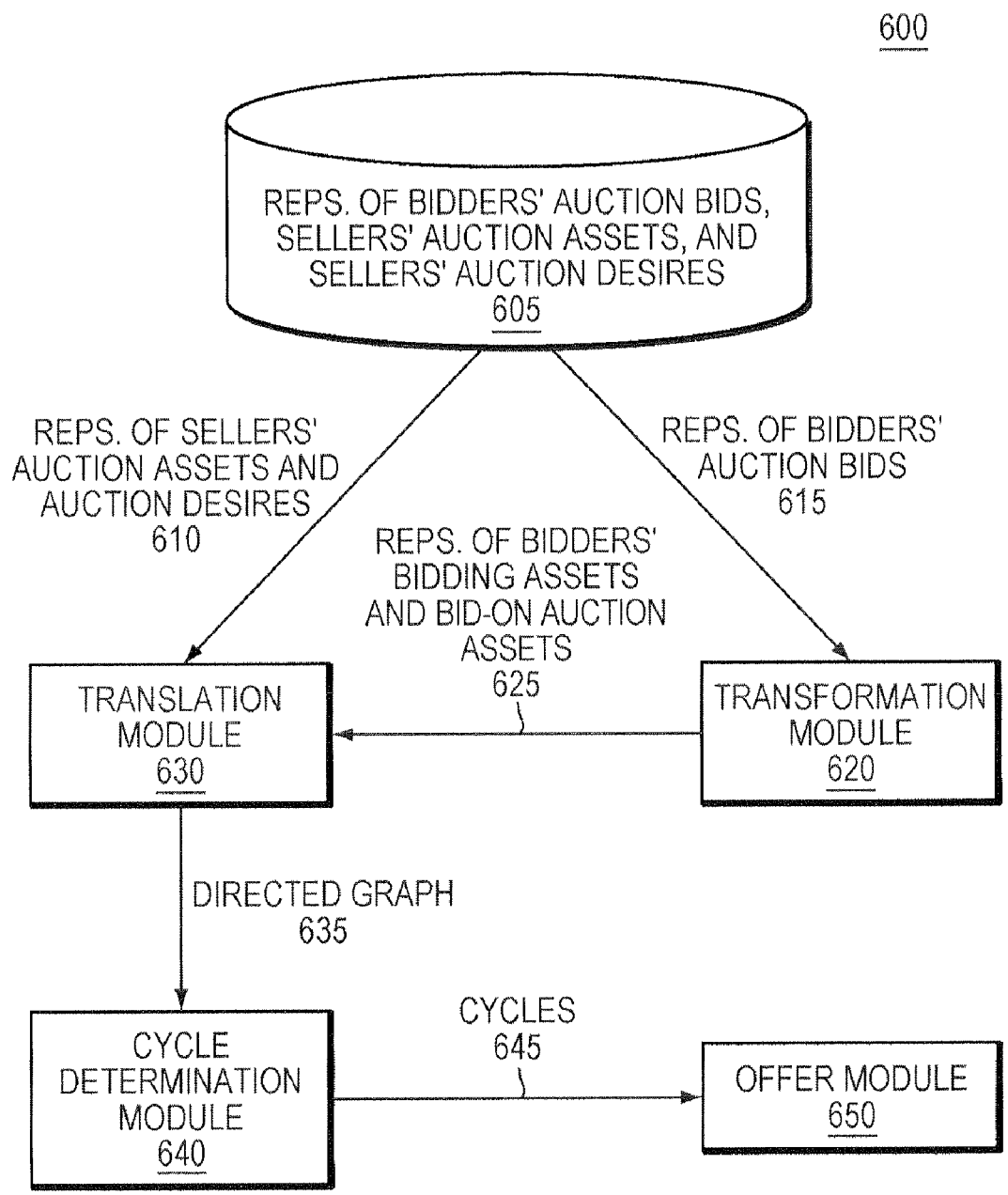
FIG. 6 is a block diagram illustrating a system for supporting asset exchanges between parties in a marketplace.

FIG. 6 is a block diagram illustrating a system 600 for supporting asset exchanges between parties in a marketplace, according to another example embodiment. The system includes representations of bidders' auction bids 615, sellers' auction assets, and sellers' auction desires 610 stored in memory 605, such as, for example, a database. The system also includes a transformation module 620 that transforms the representations of the bidders' auction bids 615 into representations of bidders' bidding assets and representations of bidders' bid-on auction assets 625. The system further includes a translation module 630 that (i) translates the representations of sellers' auction assets 610 into vertices of a directed graph 635 and the representations of sellers' auction desires 610 into edges of the directed graph 635 and (ii) translates the representations of bidders' bidding assets 625 into vertices of the directed graph 635 and the representations of bidders' bid-on auction assets 625 into edges of the directed graph 635. Also included in the system is a cycle determination module 640 that determines cycles 645 in the directed graph 635, and an offer module 650 that transforms the cycles 645 into offers among the parties and that performs an action based on the offers.

Figure 7:
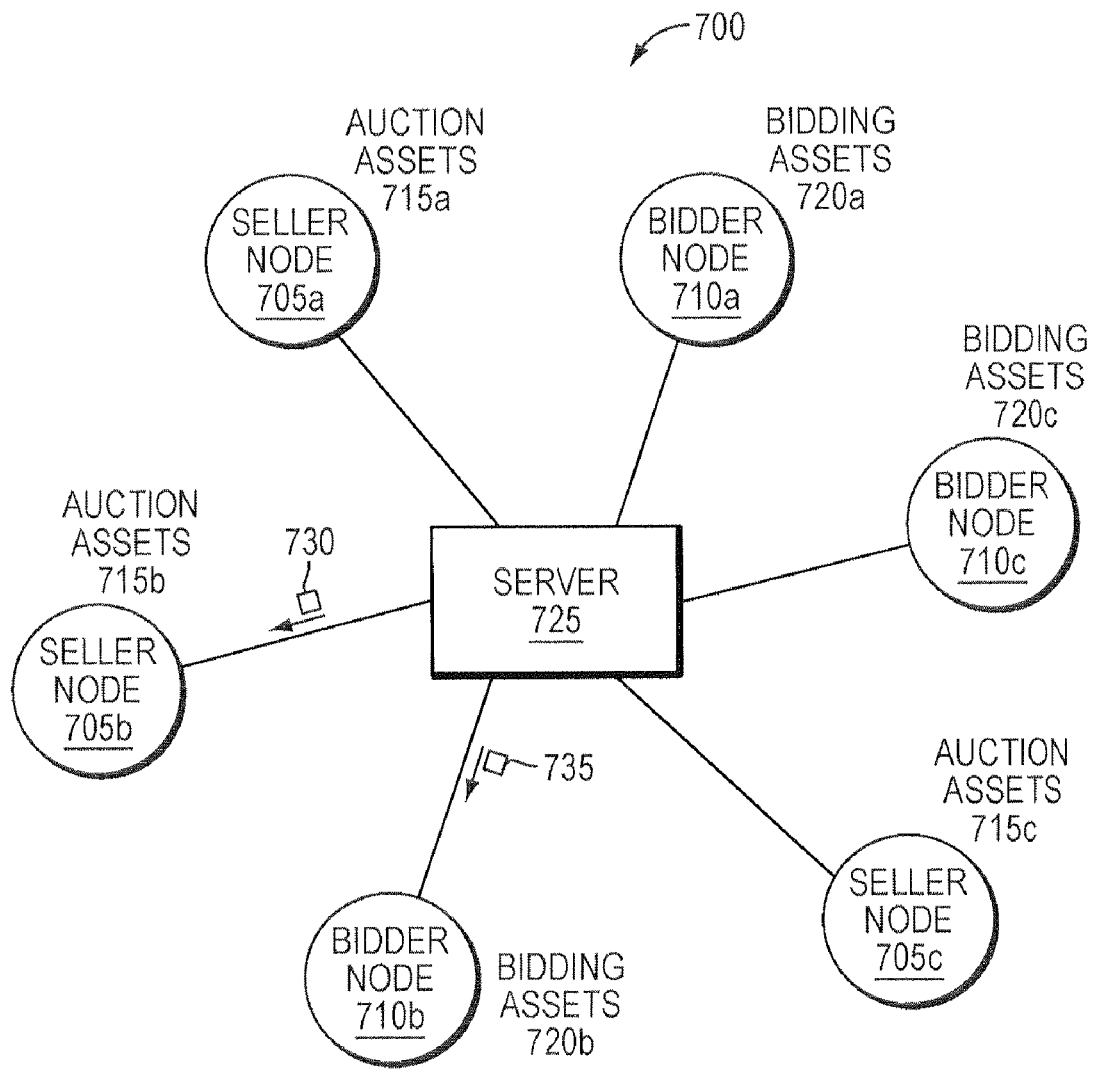
FIG. 7 is a network diagram illustrating a network for supporting asset exchanges between parties in a marketplace.

FIG. 7 is a network diagram illustrating a network 700 for supporting asset exchanges between parties in a marketplace, according to another example embodiment. The network includes seller nodes 705a-c that represent, or are associated with, sellers of the auction, and bidder nodes 710a-c that represent, or are associated with, bidders of the auction. The network also includes a server 725 that is in communication with the nodes 705a-c, 710a-c and that transforms a seller node 705a-c into a bidder node (or a bidder node 710a-c into a seller node) by transmitting, to a given node, a message that includes an offer for an asset 715a-c, 720a-c associated with another node.

For example, the seller nodes may include at least first seller node 705a and a second seller node 705b, where a first auction asset 715a is associated with the first seller node 705a and a second auction asset 715b is associated with the second seller node 705b. In such an example, the server 725 may transform the first seller node 705a into a bidder node by transmitting a message 730 to the second seller node 705b including an offer to exchange the first auction asset 715a for the second auction asset 715b. Additionally, the bidder nodes may include at least a first bidder node 710a and a second bidder node 710b, where a first bidding asset 720a is associated with the first bidder node 710a and a second bidding asset 720b is associated with the second bidder node 710b. In this example, the server 725 may transform the first bidder node 710a into a seller node by transmitting a message 735 to the second bidder node 710b including an offer to exchange the first bidding asset 720a for the second bidding asset 720b.

The server 725 may activate the seller nodes 705a-c and bidder nodes 710a-c by transmitting processor instructions, data, codes, or other electronic messages or commands to a processor or software operating on the nodes, such as, for example, a graphical user interface (GUI) Internet browser. For example, sellers and bidders may navigate, e.g., type in a uniform resource locator (URL) into a browser or otherwise navigate to the URL to access a webpage (not shown) or other environment in a domain supported by the server 725, to participate in an auction. Responsively, the server 725 may send messages or commands (not shown) to the nodes that cause the browsers to change their respective states (e.g., display information and user interface elements) to enable the sellers and bidders to participate in auction(s) in asset exchange marketplace(s). Subsequent messages or commands, for example, messages 730 and 735, may be sent by the server 725 to cause the nodes (or browsers) to change states (e.g., transform from a selling state to a bidding state).

Figure 8:
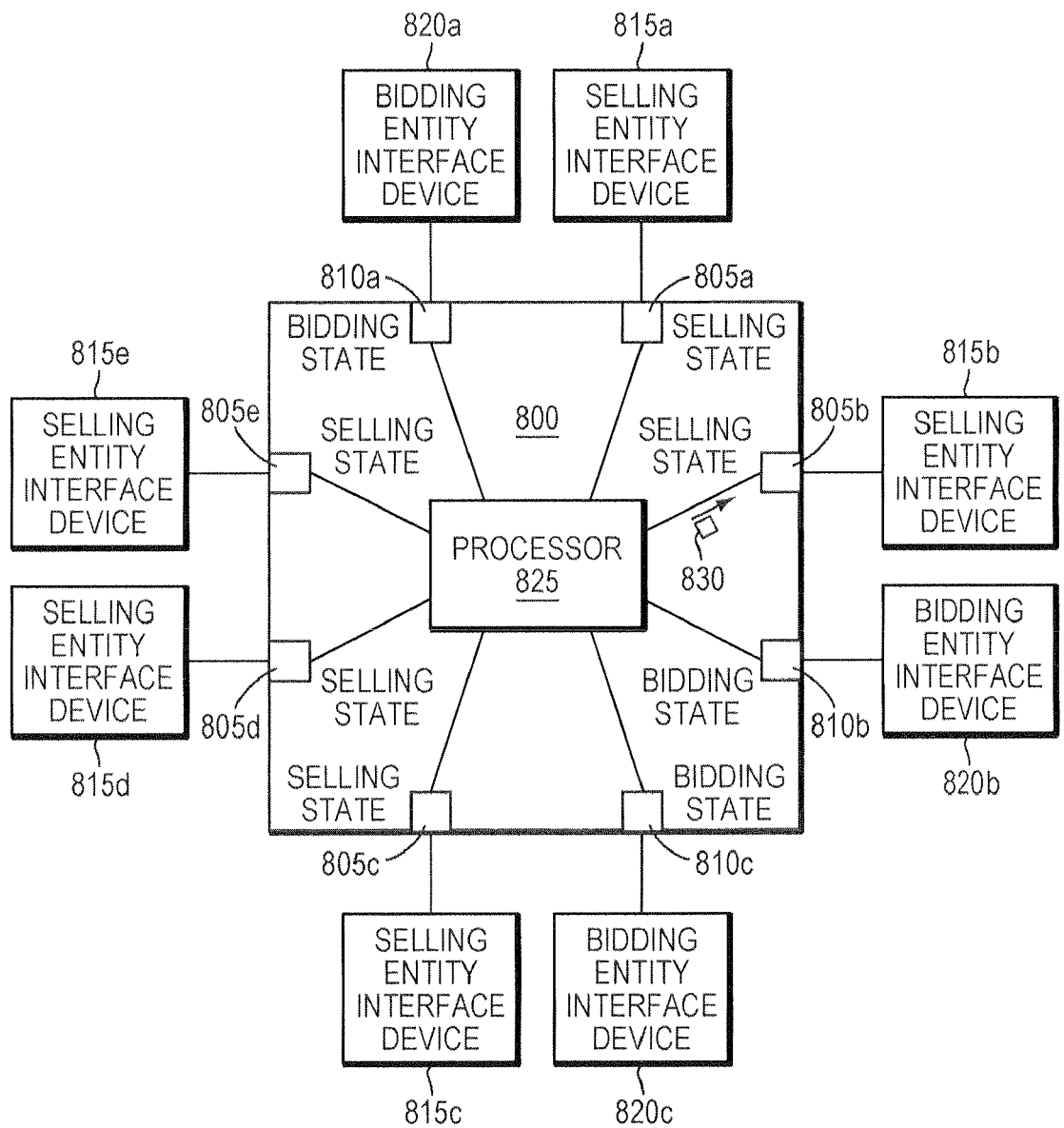
FIG. 8 is a block diagram illustrating a device for supporting asset exchanges over a network.

FIG. 8 is a block diagram illustrating a device 800 for supporting asset exchanges over a network, according to another example embodiment. The device includes a number of communication ports 805a-e, 810a-c associated with respective entity interface devices 815a-e, 820a-c. Communication ports 805a-e that are associated with selling entity interface devices 815a-e are in a selling state, and communication ports 810a-c associated with bidding entity interface devices 820a-c are in a bidding state. The device also includes a processor that changes the state of a communication port 805a-e, 810a-c from a selling state to a bidding state (or a bidding state to a selling state) by transmitting over a given communication port a message 830 including an offer for an asset associated with another communication port.

It should be understood that sellers and bidders and their respective identities, node addresses, port addresses, representations of assets and desires, states, and other information used to enable various embodiments disclosed herein can be maintained in any or combinations of any different forms of operating storage, such as, for example, tables, vectors, matrices, or databases, in any combinations of operating or accessible computer readable media, such as, for example, random access memory (RAM), magnetic media, optical media, Flash memory, or other memory types known in the art.

Figure 9:
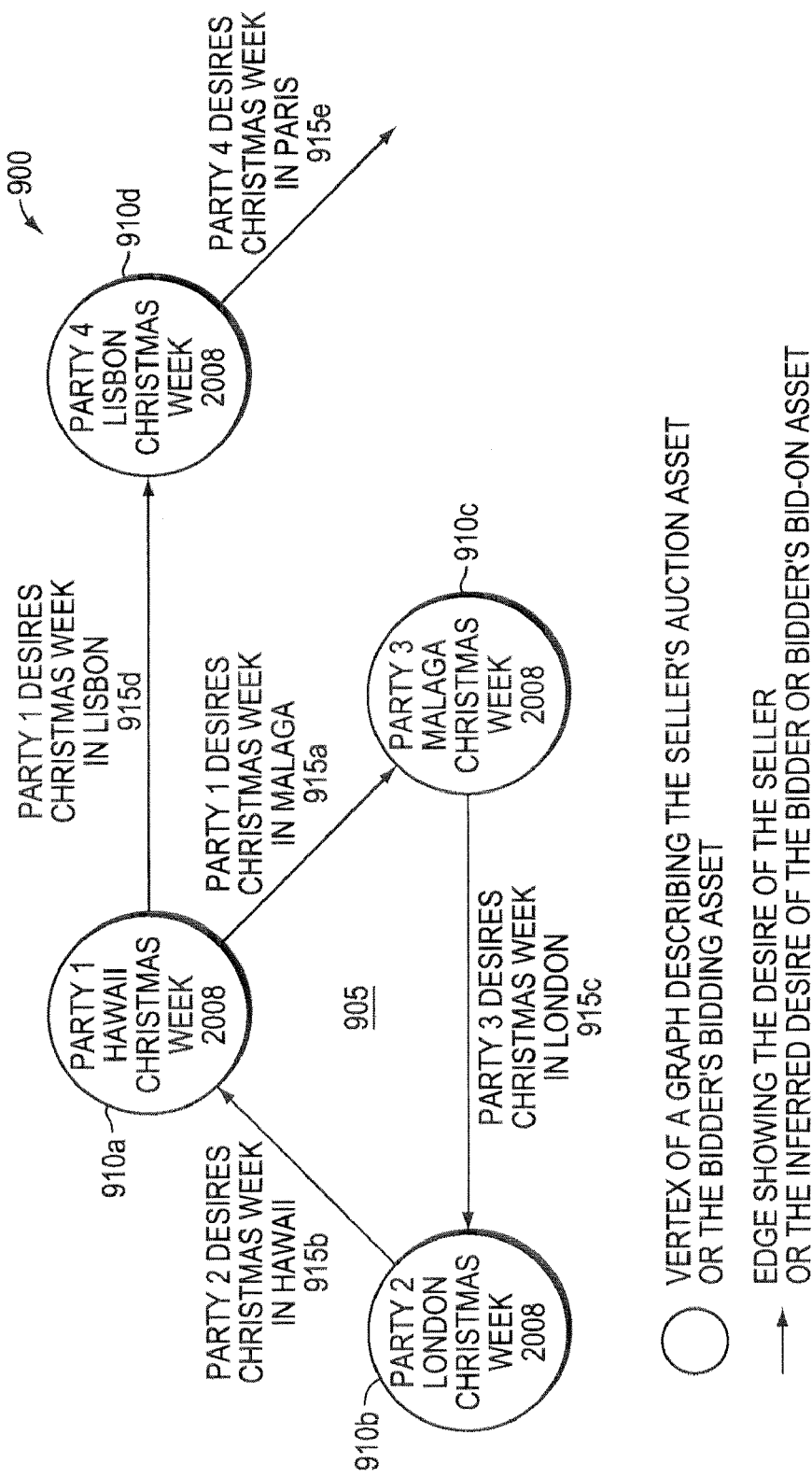
FIG. 9 illustrates a directed graph of an example embodiment of the invention.

FIG. 9 illustrates a cycle 905 in a graph 900 using an example similar to that of FIG. 2. FIG. 9 shows that the cycle 905 need not include all of a graph's vertices 910a-d and edges 915a-e that are extracted from the auction marketplace. According to the example embodiment of FIG. 9, there are four parties in the marketplace. Party 1 has the week of Christmas, 2008 in Hawaii that he has placed in a barter auction, and has expressed desires to go to either Malaga or Lisbon. This is represented by two directed edges 915a, 915d (line segments) leading from the circle which denotes the vertex 910a representing the Hawaii asset. This vertex 910a is the seller's auction asset. Likewise, Party 2 has a vertex 910b representing an asset that he has placed in an auction, which is a week in London for Christmas 2008. Party 2 has a desire to go to Hawaii for Christmas 2008, as represented by a directed edge 915b from that vertex 910b. Similarly, Party 3 has a vertex 910c representing an asset that he has placed in an auction, which is a week in Malaga for Christmas 2008. Party 3 has a desire to go to London for Christmas 2008, as represented by a directed edge 915c from that vertex 910c. Finally, Party 4 has a vertex 910d representing an asset that he has placed in an auction, which is a week in Lisbon for Christmas 2008. Party 4 has a desire to go to Paris for Christmas 2008, as represented by a directed edge 915e from that vertex 910d.

In a typical barter auction (i.e., two-way trading system) there would not be any bids in any of the auctions, as the desires 915a-e and assets 910a-d of the parties do not match. However, using the multi-party trade detection system, a cycle 905 is formed among parties 1, 2, and 3, such that party 2 gets party 1's asset 910a, party 1 gets party 3's asset 910c, and party 3 gets party 2's asset 910b. However, there exists a vertex 910d and edges 915d, 915e that cannot be a part of the cycle 905, because there is no vertex that matches the desire of Party 4, even though Party 4's asset 910d does match Party 1's desire 915d. Finally, in the above auctions, despite there being no bids, a trade among the sellers is discovered by the multi-party trade detection system.

FIG. 10 illustrates an example embodiment in the context of an English auction, such as those found in websites, such as eBay® or numerous other auction websites. According to the example embodiment, party A 1010*a* may be a seller in auction X 1005*x* for item 1 1015*a* and as a bidder in another auction Y 1005*y* for item 2 1015*b*. Similarly, party B 1010*b* may be a seller in auction Y 1005*b* for item 2 1015*b* and a bidder in auction X 1005*a* for item 1 1015*a*. Party A 1010*a* has bid $100 for item 2 1015*b* in Auction Y 1005*y* and party B 1010*b* has bid $100 for item 1 1015*a* in Auction X 1005*x*. In this instance, party A 1010*a*, as a seller in Auction X 1005*x*, has his asset (item 1) 1015*a* translated into a vertex of a graph, and party A's 1010*a* desire for item 2 1015*b*, as a bidder in Auction Y 1005*y*, is translated into an edge of the graph. Similarly, party B's 1010*b* information is translated into an edge and a vertex of the graph, and the system determines a cycle so that offers can be made to party A 1010*a* and party B 1010*b* to exchange their assets.

The example illustrated in FIG. 10 can be extended to generate trading opportunities across multiple parties that may be only bidders, only sellers, or both for cash auctions. For sellers whose desires cannot be assessed by way of their bids in other auctions, the system may infer desires for the cash amounts they would like to receive for their own assets by using methods to determine any amount based on: (i) their stated reserve price, which is the price below which they will not sell at any point in time, (ii) the fixed price at which they are willing to sell any time regardless of when the auction listing is set to expire (commonly known as the "Buy Now" price on many auction sites, (iii) the highest bid price at a given point in time, (iv) other characteristics about the auction listing, or (iv) a combination of these factors.

FIG. 11 illustrates a hybrid barter auction with a possible multi-party trade across marketplaces, as well as an opportunity for an arbitrage. A hybrid barter auction is different from an English cash auction in that a seller in the auction can place a non-cash item as the seller's auction asset. In a hybrid barter auction, sellers also state their desires in the form of a non-cash item along with a cash component, which together can be construed as the desired price.

According to the example embodiment, the auction is a hybrid barter auction where cash and non-cash assets are used. Party A 1110*a* is a seller who places his week of holiday in Hawaii for Christmas 2008 1115*a* in marketplace Alpha 1105*a*. Party A 1110*a* may use an asset manager that allows him to register his desires. Party A 1110*a* indicates a desire 1120*a* to go on a holiday to Malaga, Spain for the week of Christmas 2008, and indicates that he expects to receive $300 cash. This suggests that Party A 1110*a* believes the week of holiday in Hawaii for Christmas 2008 1115*a* is worth more than a week of holiday in Malaga for Christmas 2008 1120*a*.

In a completely different marketplace Beta 1105*c*, Party B 1110*b* creates another hybrid barter auction as a seller, in which the seller's auction asset 1115*b* is a week of holiday in Malaga for Christmas 2008. Party B 1110*b* indicates a desire 1120*b* to get a week of holiday in London for Christmas 2008 and a willingness to pay $500 in addition to providing the week in Malaga.

In a third marketplace Gamma 1105*c*, Party C sets-up a third barter auction, in which the seller's auction asset 1115*c* is a week in London for Christmas 2008. Party C 1110*c* indicates a desire 1120*c* to get a week of holiday in Hawaii for Christmas 2008 but does not add any cash component to the desire. Thus, Party C 1110*c* neither desires to pay nor demand additional cash for the week in Hawaii for Christmas 1120*c*.

The example embodiment identifies a positive cash cycle in the example of FIG. 11. A "positive cash cycle" is defined as a cycle in which the total value offered exceeds the total value demanded. Thus, in this cycle, the total value offered that can be precisely measured through cash components is $500, and the total value demanded that can be precisely measured through cash components is $300. Thus, a cycle in the example embodiment involves party B 1110*b* paying party A 1110*a* $300 and receiving party C's 1110*c* selling asset 1115*c*, which is the week of holiday in London. Party A 1110*a* receives $300 cash from party B 1110*b* plus his selling asset 1115*b*, which is a week of holiday in Malaga, Spain for Christmas 2008. Party C 1110*c* receives party A's 1110*a* selling asset 1115*a*, which is a week of holiday in Hawaii with no additional cash component in the trade.

In the above embodiment, the generated cycle is then transformed into offers, which may be communicated to the parties in the cycle for possible acceptance. Also, in the above cycle, an exchange intermediary may undertake the role of presenting and coordinating the offers. Such an intermediary may choose to take advantage of an arbitrage of value that is present in the cycle. In other words, party B 1110*b* is willing to pay $500 and yet only $300 is demanded in the cycle by party A 1110*a*. Thus, the intermediary may take advantage of such an asymmetry present across the auctions 1105*a-c* and participating parties 1110*a-c* such that party B's 1110*b* original offer may be accepted while facilitating the exchanges between all parties 1110*a-c*, and the additional $200 can be retained as an arbitrage by the intermediary. The arbitrage may also be divided among the parties 1110*a-c* in a variety of ways or given back to party B 1110*b* in its entirety as described above.

In the same example, if party B 1110*b* offered only $200, the example scenario would be a negative value cycle, in which the sum of the value offered that can be precisely measured through cash components is greater than the sum of the value demanded that can be precisely measured through cash components. In this situation, revised offers may be constructed and communicated to the parties. For example, it is possible to ask party B 1110*b* for an additional $100, or the difference may be divided equally among all parties 1110*a-c* such that party B 1110*b* is asked to pay $33.33, party C 1110*c* is asked to pay $33.33, and party A 1110*a* is asked to accept $33.33 less than what was originally demanded. Alternatively, other rules may be deployed to handle the difference. Finally, there may also be a neutral value cycle where the precisely measured components in the cycle are balanced, such as the total cash demanded being equal to the total cash offered.

The parties of such auction marketplaces may pre-commit themselves into accepting what they have stated as their desires if they are met. In this case, when an offer to a party matches the party's desire, the system does not communicate offers for acceptance; rather, the system automatically executes the trades. Additionally, in another embodiment of the invention, these offers may be subject to a time window within which the offers need to be accepted; otherwise, the offers expire. The rejection of an offer by one party in the cycle may also causes the entire cycle to fail, resulting in nobody being able to realize the offer. Therefore, in some embodiments, offers may be contingent on the acceptance of all parties to the trade.

In some embodiments, sellers may state multiple desires and rank them to show their preferences, and likewise, an implied preference ranking may be revealed by evaluating multiple bids that a bidder may make. Such rankings may be used in the process of choosing the disjoint cycles by the system that are transformed into offers for the parties involved in the possible trade.

Figure 12:
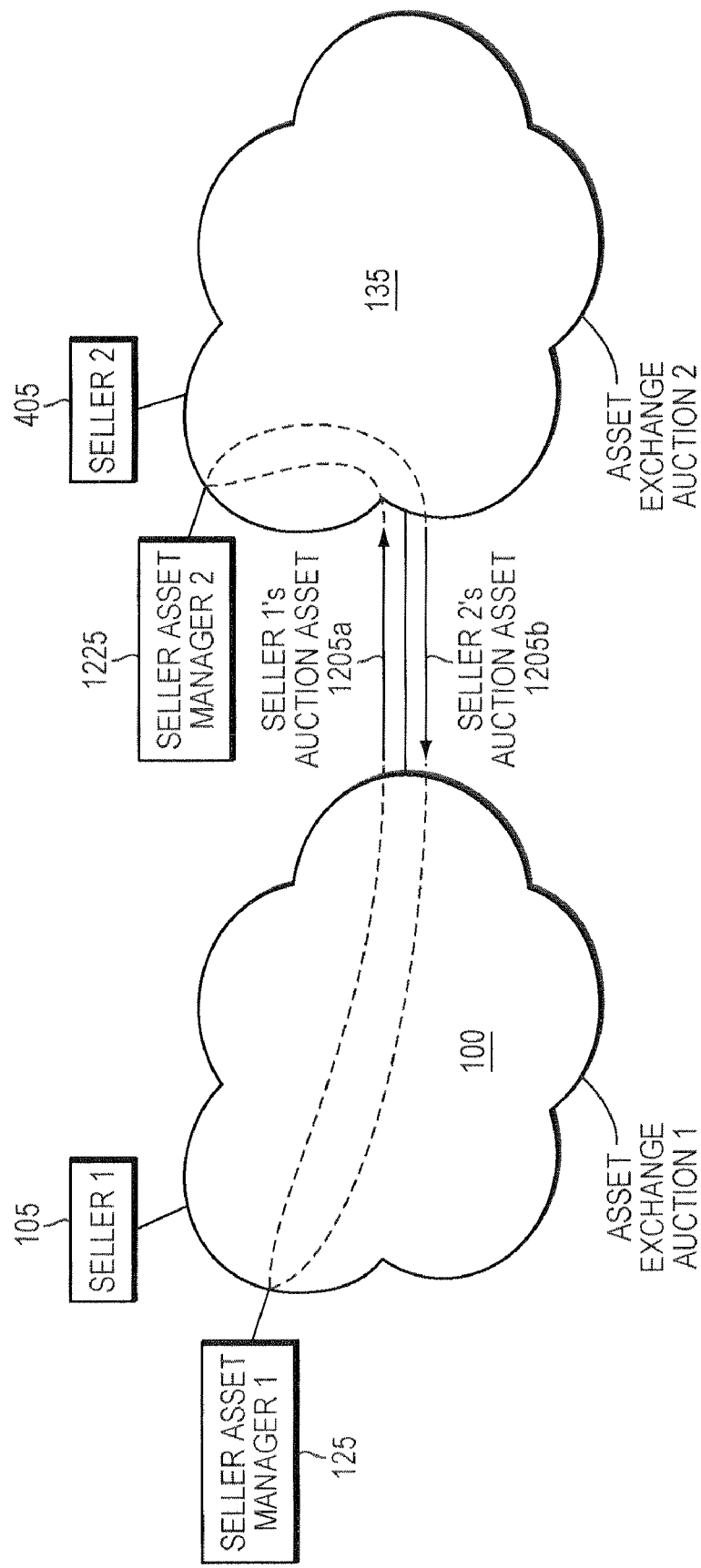
FIG. 12 illustrates inter-connected marketplaces for auctions, using computer networks including, for example, the Internet, where a system has detected an opportunity for one seller to trade directly with another seller.

Additionally, in hybrid barter auctions where sellers reveal their desires, some embodiments of the system have sellers trade among themselves as illustrated in FIG. 12. In this example, there are two sellers 1 105 and 2 405 in two different marketplaces 100, 135, depicted by two clouds. FIG. 12 shows that the sellers 105, 405 may exchange their assets 1205a, 1205b across these marketplaces 100, 135 instead of having a seller first sell his asset for cash and then use the cash to buy the other's asset. Such an exchange is enabled by allowing the system to infer the sellers' desires through multiple methods, including an explicit representation of those desires. Embodiments of the system may use criteria to guide the cycle determination process such that in processing multiple cycle opportunities, any ordered preferences revealed by the sellers and bidders in the auctions are either strictly or partially adhered to. Opportunities are also chosen in such a way as to favor one or more parties depending on rules established for the system.

Figure 13:
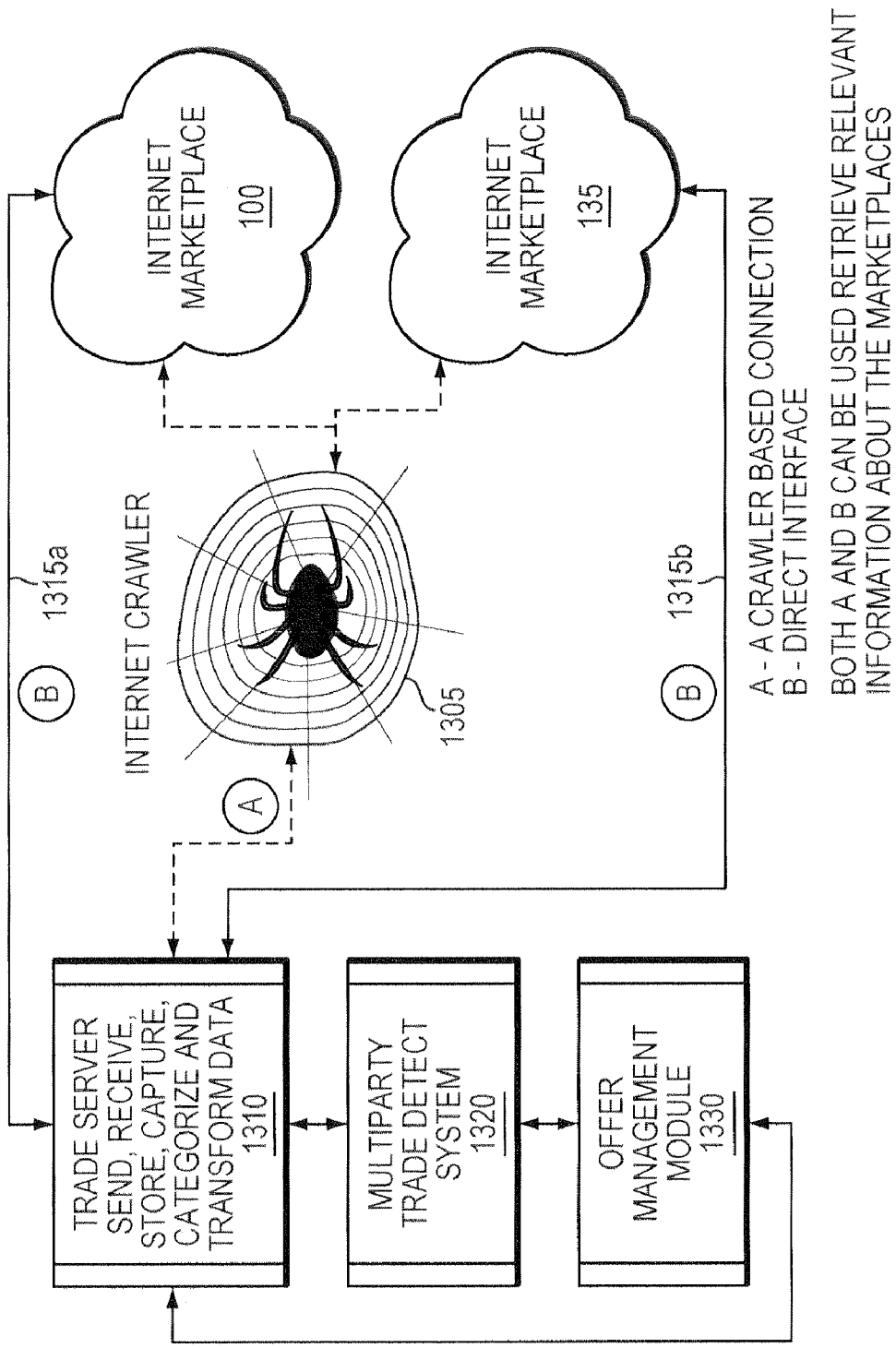
FIG. 13 illustrates a system that interacts with wide area network marketplaces using either a direct connection or a network crawler to enable multi-party trading opportunities.

An example embodiment of a system that extracts information about on-going auctions in online public marketplaces, along with the corresponding parties information, is shown in FIG. 13 in the form of an automated crawler 1305 that crawls Internet auction marketplaces and that acquires such information. According to the example embodiment, two Internet marketplaces 100, 135 are depicted in the form of two clouds, and there is at least two methods by which relevant information may be exchanged between the marketplaces 100, 135 and a trade server 1310. Method A shows the use of automated crawling technology 1305 to crawl various marketplaces 100, 135 on a wide area network, such as, for example, the Internet, to exchange information. Method B depicts direct interfaces 1315a, 1315b between the marketplaces 100, 135 and the trade server 1310.

The trade server 1310 broadly serves the function of sending, receiving, storing, capturing, categorizing, and transforming data based on rules and parameters configured in the system. The trade server 1310 then communicates with a multi-party trade detect system 1320, which is used detect various multi-party trading opportunities. The multi-party trade detect system 1320 then passes the detected opportunities to an offer management system 1330, which creates and manages offer until they are either accepted or rejected. The offer management system 1330 may communicates any offer-related information to the trade server 1310, which may pass the information back to the relevant participants within the marketplaces 100, 135.

Figure 14:
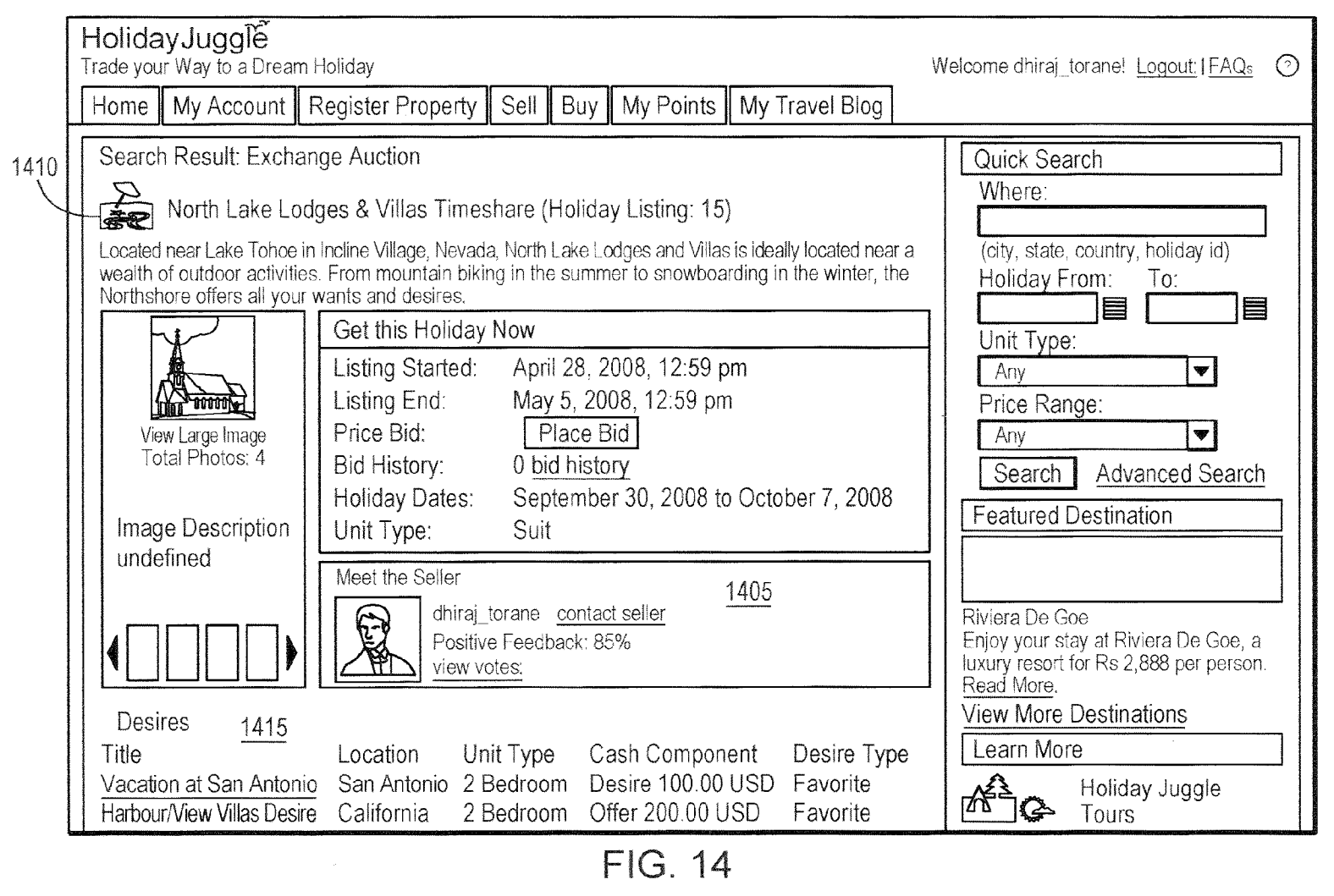

FIG. 14 illustrates an example interface to a hybrid barter auction. As shown, a seller 1405 has listed an asset 1410, which is a week starting September 30 at North Lake Lodges and Villas in Lake Tahoe. The seller 1405 has also listed his desires 1415 for either a vacation in San Antonio or a vacation at Harbor View Villas. The seller 1405 has also indicated that he would offer $200 in addition to their week to get a vacation at Harbor View Villas and demands an additional $100 in order to trade his week for a vacation in San Antonio. Both of these desires 1415 are shown as being uncommitted desires. If matched, the seller 1405 is willing to consider these matches, as the seller 1405 has indicated that they are "favorite," but not "committed," desires.

Figure 15:
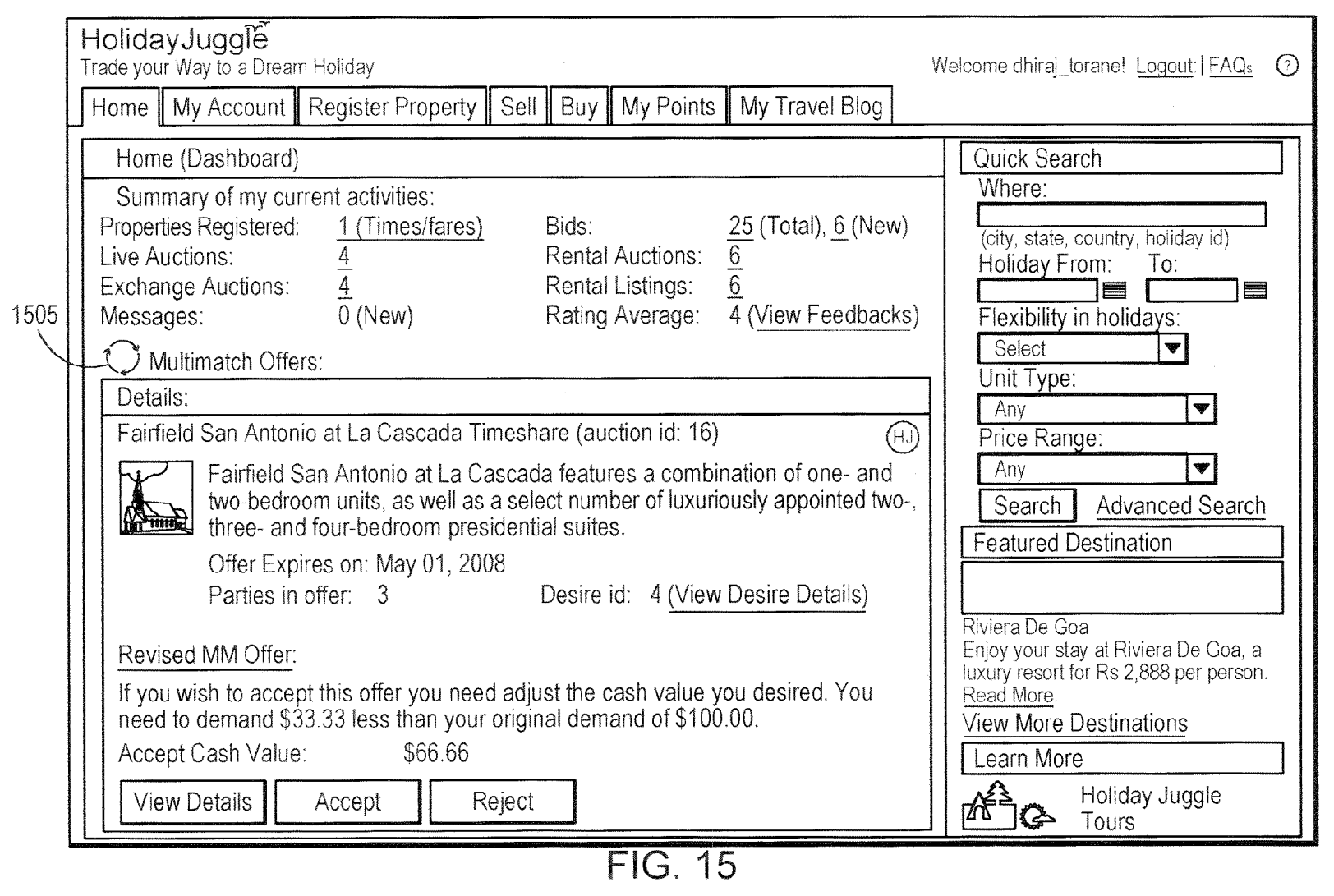

FIG. 15 illustrates the example interface to the hybrid barter auction where an offer to the party 1405 (FIG. 14) is presented after the party's auction information has been processed by the system. Under the section titled "MultiMatch Offers" 1505, is an offer for the seller 1405 to trade his week in North Lake Lodges for a vacation in San Antonio. The system indicates that there are a total of three parties involved in the trade and that in order for the offer to be valid, the seller 1405 would need to accept a lower cash offer of $66.66 as compared to the $100 that the seller 1405 had indicated in his desire 1415 (FIG. 14).

Similar examples as described above may be used to determine cycles within an English auction format involving multi-party trades across marketplaces and across auctions. Similar methods of offer generation that take into account whether the cycles are positive, negative or neutral may also be used.

FIG. 16 illustrates an English auction where a system has detected multi-party opportunities across auctions and marketplaces that result in a part-barter, part-auction, and part-retail purchase. According to the example embodiment, a positive cash cycle exists that results from transactions across multiple marketplaces, where an arbitrage is returned to a trading party. As described above, however, this arbitrage value may alternatively be retained by an exchange intermediary or shared among the various parties.

Due to the presence of information asymmetries across marketplaces that can be separated by time, physical location, or differences in the user bases of marketplaces (particularly in electronic marketplaces), parties that participate in one marketplace as sellers or buyers need not participate in another. FIG. 16 illustrates one such instance that combines English auctions to yield barter and cash trades. The auction is a positive value cycle English auction, because positive value cycles may be arbitraged across marketplaces and across auctions. FIG. 16 is separated into two parts: a "Sell Side" and a "Buy Side." For a given auction, the Sell Side shows information about the seller and the Buy Side shows information about the bidders.

FIG. 16 shows four marketplaces Alpha 1605a, Beta 1605b, Theta 1605c and Gamma 1605d, each with one respective seller, namely party 1 1610a, party 2 1610b, party 3 1610c, and party 4 1610d. Because these are separate marketplaces 1605a-d, there may be considerable information asymmetry across the marketplaces 1605a-d, resulting in different prices and bids for the same items across the different marketplaces 1605a-d.

In marketplace Alpha 1605a, party 1 1610a is the seller of item A 1615a in an auction that also has a "Buy Now" retail price of $500 and an auction "Reserve Price" of $400. The "Buy Now" price indicates that any buyer or bidder can stop the auction by paying the seller 1610a the Buy Now price of $500. The auction Reserve Price indicates that party 1 1605a will not accept a price less than $400 as a bid for the product, or, in other words, the minimum bid for the auction is $400. However, in this example, party 1 1605a has not received any bids for item A 1615a.

In marketplace Beta 1605b, party 2 1610b is also selling another of the same item A 1615b, where item A 1615a, 1615b is a standardized widget of which multiple identical items can be produced. Party 2 1610b has stipulated a Buy Now price of $700 and an auction Reserve Price of $400. There are two bidders for item A 1615b. The bidders are party 4 1610d, with a bid of $600, and party 3 1610c, with a higher bid of $650. In marketplace Theta 1605c, party 3 is the seller of item B 1615c with an auction Reserve Price of $800 and no Buy Now price is set. There is one bidder for item B 1615c, in that party 2 1610b has bid an amount of $900. In marketplace Gamma 1605d, party 4 1610d is the seller of item C 1615d. Party 4 1610d has an auction Reserve Price of $100 and no Buy Now price is set. There is one bidder for item C 1615d, in that party 1 1610a has bid an amount of $150.

Figure 17:
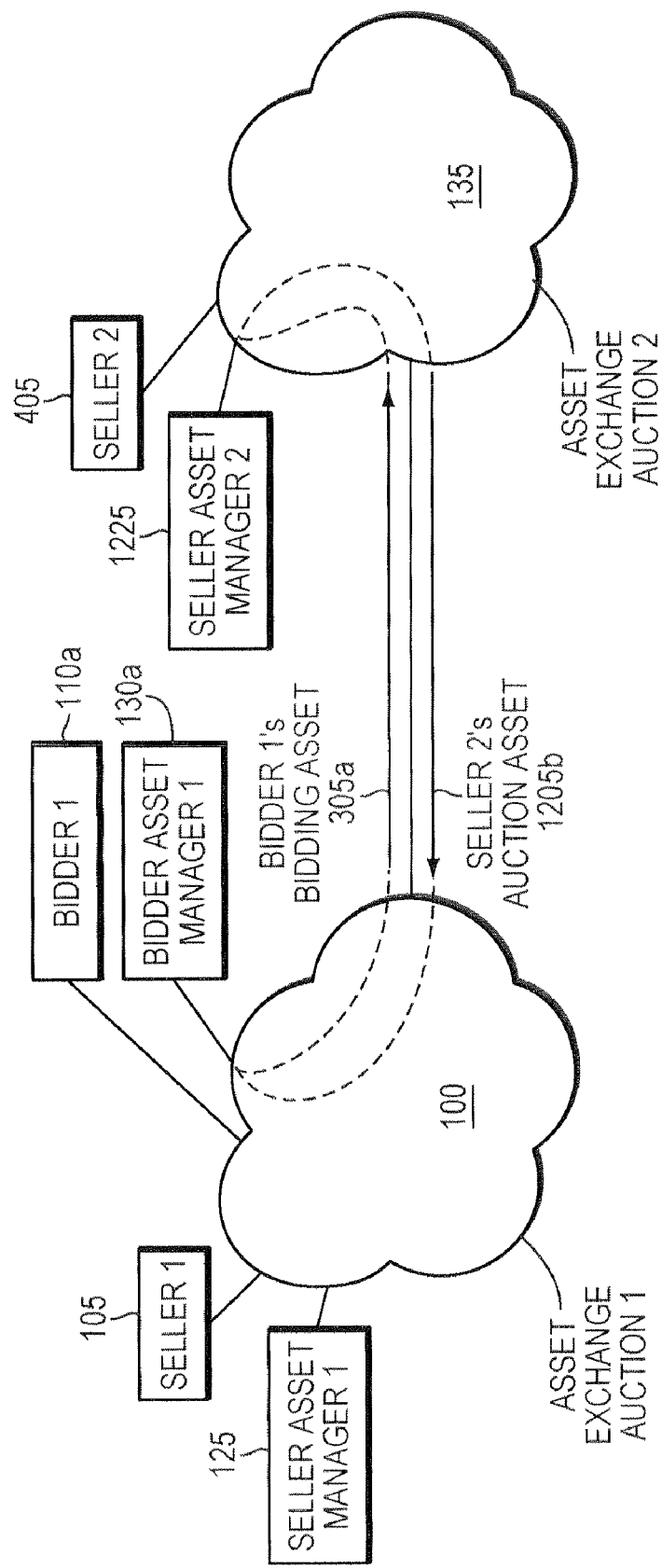
FIG. 17 illustrates inter-connected marketplaces for auctions, using computer networks including, for example, the Internet, where a system has detected an opportunity for bidders' bidding in auctions to trade with sellers in whose auctions they have not bid.

In this example, several possible outcomes may be provided by a computerized program of the system based on parameter settings and configurations of the system. Some example outcomes include:

a) An offer may be created so that party 2 1610*b* and party 3 1610*c* may exchange items A 1615*b* and B 1615*c* among themselves, and party 2 1610*b* may pay party 3 1610*c* $250 in addition to receiving item B 1615*c*. This is possible because, party 3 1610*c* is the highest bidder in party 2's 1610*b* auction and party 2 1610*b* is the only bidder in party 3's 1610*c* auction. Because party 2 1610*b* bid $900 for item B 1615*c* and party 3 1610*c* bid $650 for item A 1615*b*, the difference between the two amounts (e.g., $250) is owed by party 2 1610*b* to party 3 1610*c*; and b) Party 4 1610*d*, having lost the auction for item A 1615*b* in party 2's 1610*b* auction, is made an offer based on party 1's 1610*a* auction, in which party 4 1610*d* did not bid. FIG. 17 illustrates an example in which the system detects an opportunity for bidders bidding in auctions to trade with sellers in whose auctions they have not bid. The absence of a bid can be the result of information asymmetries across marketplaces. Put another way, party 4 1610*d* may not be aware of party 1's 1610*a* auction. Additionally, price differences for identical items 1615*a*, 1615*b* across the auctions in marketplaces Alpha 1605*a* and Beta 1605*b* are also possible due to information asymmetries. Put another way, party 1 1610*a* was possibly not aware of the auction and bids in marketplace Beta 1605*b*. The offer created by the system may be an offer for party 4 1610*d* to exchange item C 1615*d* for party 1's 1610*a* item A 1615*a* and to also pay an additional cash amount of $350. This is recommended, since the Buy Now price for item A 1615*a* in marketplace Alpha 1605*a* is $500, and party 1's 1610*a* bid for party 4's 1610*d* item C 1615*d* is $150. The difference in value between the two items is $350 that may be owed by party 4 1610*d* to party 1 1610*a* to complete the exchange based on the values disclosed in the auctions and bids.

There is an opportunity for an exchange intermediary to take advantage of an arbitrage presented in a positive value cycle. The arbitrage results from Party 4 1610*d* being willing to pay $600 for item A 1615*b* in marketplace Beta 1605*b*. However, this is shown as being returned to party 4 1610*d* based on the recommendation in outcome (b) above. The system can be constructed to show negative or neutral value cycles by having party 4 1610*d* bid $450 to yield a negative value cycle and $500 to yield a neutral value cycle. However, the system may also be configured to take advantage of the arbitrage present across marketplaces, multiple auctions, bids, and parties in a manner that benefits one or more parties, including intermediaries.

FIG. 17 illustrates another embodiment, in which bidder 1 110*a* in the first marketplace 100 is engaged in an asset exchange with seller 2 405 in a second marketplace 135. Two marketplaces 100, 135 are depicted by two clouds and the exchange is depicted by two lines with arrows depicting the direction of the transfer. A third line with no arrows is shown to connect the two marketplaces 100, 135. This can be any networking and communication based connection that facilitates the free flow of information between the two marketplaces. Such an exchange is enabled by allowing the system to infer the seller's 405 and bidder's 110*a* desires through multiple methods, including explicit representations of those desires by the seller 405 and bidder 110*a*. In some embodiments, the explicit representations are registered through respective asset managers 130*a*, 1225 or inferred from past transaction histories within the same or other marketplaces, past or present bids, or auctions within the same marketplace or other marketplaces. Committed and uncommitted desires may also be used in the example embodiment. Thus, automated execution of trades is possible, and in addition, offers may be contingent on the acceptance of all parties to the trade.

While this invention has been particularly shown and described with references to example embodiments thereof, it will be understood by those skilled in the art that various changes in form and details may be made therein without departing from the scope of the invention encompassed by the appended claims.

It should be understood that the flow diagram of FIG. 5 is an example that can include more or fewer components, be partitioned into subunits, or be implemented in different combinations. Moreover, the flow diagram may be implemented in hardware, firmware, or software. If implemented in software, the software may be written in any software language suitable for use in the networks and devices illustrated in FIGS. 1, 3, 4, 6-8, 12, 13, and 17, for example. The software may be embodied on any form of computer readable medium, such as RAM, ROM, or magnetic or optical disk, and loaded and executed by generic or custom processor(s).

What is claimed is:

1. A system for supporting asset exchanges between parties of an auction including sellers and bidders, the system comprising:
   a processor and memory implementing:
   a transformation module configured to transform representations of bidders' auction bids into representations of bidders' bidding assets and representations of bidders' bid-on auction assets;
   a translation module configured to (i) translate representations of sellers' auction assets into vertices of a directed graph and representations of sellers' auction desires into edges of the directed graph and (ii) translate the representations of bidders' bidding assets into vertices of the directed graph and the representations of bidders' bid-on auction assets into edges of the directed graph;
   a cycle determination module configured to determine cycles in the directed graph, a cycle being a path starting at a given vertex and ending at the given vertex, the path including multiple edges and at least one intermediate vertex; and
   an offer module configured to transform the cycles into offers among the parties and to perform an action based on the offers.

2. A system as in claim 1 wherein (i) the cycle determination module is configured to determine whether a first cycle shares a vertex or edge with a second cycle and (ii) the offer module is configured to transform either the first cycle or the second cycle into an offer in an event the first cycle shares a vertex or edge with the second cycle.

3. A system as in claim 1 wherein the representations of sellers' auction desires include representations of desired assets with precise values.

4. A system as in claim 3 wherein the representations of assets with a precise values include at least one of the following representations of instruments having precise values: cash, loyalty points, or an asset having a market value that is guaranteed, appraised, or certified for a specific value or value range in cash or points.

5. A system as in claim 1 wherein the offer module is configured to (i) transform cycles having positive values into offers, a cycle having a positive value if a total value offered exceeds a total value demanded and (ii) present representations of the offers to respective sellers.

6. A system as in claim 5 wherein the offer module is further configured to determine whether excess positive value exists in a cycle and to direct the excess positive value to at least one of the following parties: a seller, a bidder, or an asset exchange intermediary.

7. A system as in claim 5 wherein the offer module is further configured to, for a cycle having a negative value, make a determination whether one or more parties involved in the cycle is or are willing to (i) accept an offer that is less than their respective desired asset or (ii) offer more than their respective desired offer, and to adjust the representations of the parties' auction desires based on the determination.

8. A system as in claim 1 wherein the cycle determination module is further configured to prioritize the cycles based on representations of preferences associated with the sellers' auction desires.

9. A system as in claim 1 wherein the cycle determination module is further configured to sequence and prioritize the cycles according to preset parameters.

10. A system as in claim 9 wherein (i) the preset parameters include parameters of exact matches and inexact matches, and (ii) the cycle determination module is further configured to order the cycles from exact matches to inexact matches according to the parameters.

11. A system as in claim 9 wherein (i) the preset parameters include parameters representing committed desires and uncommitted desires, and (ii) the cycle determination module is further configured to order the cycles from committed desires to uncommitted desires according to the parameters.

12. A system as in claim 1 wherein the offer module is further configured to close an offer upon (i) acceptance of the offer by the corresponding seller, (ii) decline of the offer by the corresponding seller, or (iii) reaching a timeout associated with the offer.

13. A system as in claim 1 wherein the offer module is further configured to transform a cycle into a contingent offer if (i) the cycle includes representations of three parties, (ii) the sellers' auction desires are not exactly matched, or (iii) the cycle has an associated timeout that is set to be reached at a given time in the future.

14. A system as in claim 1 wherein the offer module is further configured to (i) present representations of the offers to the sellers if the sellers' auction desires are not met and (ii) execute asset exchanges between the sellers and bidders if the sellers' auction desires are met.

15. A system as in claim 1 wherein the offer module is further configured to present representations of the offers to the sellers or execute an asset exchange based on asset exchange parameters set by the sellers and bidders.

16. A system as in claim 1 further comprising:
an interface to multiple auctions or trading forums occurring at the same time, the interface enabling a party of the auction to list an auction asset in at least one of the multiple auctions or trading forums; and
a monitor module to monitor the multiple auctions or trading forums and, in an event the party's auction asset is exchanged or sold in one of the auctions or trading forums, to withdraw the party's auction asset from the remaining auctions or trading forums.

17. A method of supporting asset exchanges between parties of an auction including sellers and bidders, the method comprising:
translating representations of sellers' auction assets into vertices of a directed graph and representations of sellers' auction desires into edges of the directed graph;
transforming representations of bidders' auction bids into representations of bidders' bidding assets and representations of bidders' bid-on auction assets;
translating the representations of bidders' bidding assets into vertices of the directed graph and the representations of bidders' bid-on auction assets into edges of the directed graph;
determining cycles in the directed graph, a cycle being a path starting at a given vertex and ending at the given vertex, the path including multiple edges and at least one intermediate vertex;
transforming the cycles into offers between the parties; and
performing an action based on the offers,
wherein at least one of the translating, transforming and determining is performed by at least one processor and the performing an action is optionally performed by the at least one processor.

18. The method of claim 17 further comprising determining whether a first cycle shares a vertex or edge with a second cycle, and wherein transforming the cycles into offers includes transforming either the first cycle or the second cycle into an offer in an event the first cycle shares a vertex or edge with the second cycle.

19. The method of claim 17 wherein the representations of the sellers' auction desires include representations of desired assets with precise values.

20. The method of claim 19 wherein the representations of assets with precise values include at least one of the following representations of instruments having precise values: cash, loyalty points, or an asset having a market value that is guaranteed, appraised, or certified for a specific value or value range in cash or points.

21. The method of claim 17 wherein transforming the cycles includes (i) transforming cycles having positive values into offers, a cycle having a positive value if a total value offered exceeds a total value demanded, and (ii) presenting representations of the offers to respective sellers.

22. The method of claim 21 further comprising:
determining whether excess positive value exists in a cycle; and
removing the excess positive value from the cycle.

23. The method of claim 22 further comprising providing the excess positive value to at least one of the following parties: a seller, a bidder, or an asset exchange intermediary.

24. The method of claim 21 wherein transforming the cycles includes, for a cycle having a negative value, making a determination whether one or more parties involved in the cycle is or are willing to (i) accept an offer that is less than their respective desired asset or (ii) offer more than their respective desired offer, and adjusting a representations of the parties' auction desires based on the determination.

25. The method of claim 17 further comprising prioritizing the cycles based on representation of preferences associated with the representations of the sellers' auction desires.

26. The method of claim 17 wherein determining the cycles includes sequencing and prioritizing the cycles according to preset parameters.

27. The method of claim 26 wherein (i) the preset parameters include parameters of exact matches and inexact matches, and (ii) determining the cycles includes ordering the cycles from exact matches to inexact matches according to the parameters.

28. The method of claim 26 wherein (i) the preset parameters include parameters representing committed desires and uncommitted desires, and (ii) determining the cycles includes ordering the cycles from committed desires to uncommitted desires according to the parameters.

29. The method of claim 17 further comprising closing an offer upon (i) acceptance of the offer by the corresponding seller, (ii) decline of the offer by the corresponding seller, or (iii) reaching a timeout associated with the offer.

30. The method of claim 17 wherein transforming the cycles into offers includes transforming a cycle into a contingent offer if (i) the cycle includes three parties, (ii) the sellers' auction desires are not exactly matched, or (iii) the cycle has an associated timeout that is set to be reached at a given time in the future.

31. The method of claim 17 wherein performing an action includes presenting representations of the offers to the corresponding sellers if the corresponding sellers' auction desires are not met.

32. The method of claim 17 wherein performing an action includes executing asset exchanges between the sellers and bidders if the sellers' auction desires are met.

33. The method of claim 17 wherein performing an action includes presenting representations of the offers to the sellers or executing an asset exchange between the parties based on asset exchange parameters set by the sellers or bidders.

34. The method of claim 17 further comprising:
   enabling a party of the auction to list an auction asset in multiple auctions or trading forums occurring at the same time; and
   in an event the party's auction asset is exchanged or sold in one of the auctions or trading forums, withdrawing the party's auction asset from the remaining auctions or trading forums.

* * * * *